(12) United States Patent
Igarashi et al.

(10) Patent No.: US 9,161,220 B2
(45) Date of Patent: Oct. 13, 2015

(54) COMMUNICATION SYSTEM, INFORMATION PROCESSING DEVICE, CONNECTION DEVICE, AND CONNECTION DEVICE DESIGNATION METHOD FOR DESIGNATING CONNECTION DEVICE FOR COMMUNICATION DEVICE TO CONNECT TO

(71) Applicant: CANON KABUSHIKI KAISHA, Tokyo (JP)

(72) Inventors: Kai Igarashi, Kanagawa (JP); Naoki Umemura, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 139 days.

(21) Appl. No.: 13/856,519

(22) Filed: Apr. 4, 2013

(65) Prior Publication Data
US 2013/0242967 A1    Sep. 19, 2013

Related U.S. Application Data

(62) Division of application No. 12/368,899, filed on Feb. 10, 2009, now Pat. No. 8,432,869, which is a division of application No. 10/799,011, filed on Mar. 12, 2004, now Pat. No. 7,620,027.

(30) Foreign Application Priority Data

Mar. 14, 2003  (JP) ................. 2003-069808
Jul. 7, 2003    (JP) ................. 2003-193019

(51) Int. Cl.
*H04W 12/06* (2009.01)
*H04W 48/20* (2009.01)
*H04W 48/14* (2009.01)
*H04W 84/12* (2009.01)
*H04W 88/08* (2009.01)
*H04W 92/20* (2009.01)

(52) U.S. Cl.
CPC ............. *H04W 12/06* (2013.01); *H04W 48/14* (2013.01); *H04W 48/20* (2013.01); *H04W 84/12* (2013.01); *H04W 88/08* (2013.01); *H04W 92/20* (2013.01)

(58) Field of Classification Search
CPC ............................ H04W 12/06; H04W 48/20
See application file for complete search history.

(56) References Cited

U.S. PATENT DOCUMENTS

| | | | | |
|---|---|---|---|---|
| 6,957,067 | B1 * | 10/2005 | Iyer et al. | 455/435.1 |
| 7,028,186 | B1 * | 4/2006 | Stenman et al. | 713/173 |
| 7,233,792 | B2 * | 6/2007 | Chang | 455/422.1 |
| 2003/0177350 | A1 * | 9/2003 | Lee | 713/155 |
| 2004/0068668 | A1 * | 4/2004 | Lor et al. | 713/201 |
| 2004/0088550 | A1 * | 5/2004 | Maste | 713/182 |
| 2007/0112948 | A1 * | 5/2007 | Uhlik | 709/223 |
| 2008/0101291 | A1 * | 5/2008 | Jiang et al. | 370/331 |

\* cited by examiner

*Primary Examiner* — Jason Mattis

(74) *Attorney, Agent, or Firm* — Cowan, Liebowitz & Latman, P.C.

(57) ABSTRACT

A communication apparatus is provided that includes: a receiving unit that receives communication parameter for connecting to a first base station via a second base station; a connecting unit that connects to the first base station based on the received communication parameter; and an authentication unit that performs authenticated process with the first base station based on the received communication parameter.

5 Claims, 29 Drawing Sheets

FIG. 3

| DATE | YEAR | MONTH | DAY | DAY OF THE WEEK | RESERVED MEETING ROOM | MEETING ROOM NAME | PERIOD | | START | END | MEETING NAME |
|---|---|---|---|---|---|---|---|---|---|---|---|
| | | | | | | | | | | | |
| MEETING ROOM NAME | PERIOD | | | | | | | | | | |
| | 8:00 – | 9:00 – | 10:00 – | 11:00 – | 12:00 – | 13:00 – | 14:00 – | 15:00 – | 16:00 – | 17:00 – | |
| MEETING ROOM 1 | | | | | | | | | | | |
| MEETING ROOM 2 | | | | | | | | | | | |
| MEETING ROOM 3 | | | | | | | | | | | |
| MEETING ROOM 4 | | | | | | | | | | | |
| MEETING ROOM 5 | | | | | | | | | | | |
| MEETING ROOM 6 | | | | | | | | | | | |
| MEETING ROOM 7 | | | | | | | | | | | |
| MEETING ROOM 8 | | | | | | | | | | | |
| MEETING ROOM 9 | | | | | | | | | | | |
| MEETING ROOM A | | | | | | | | | | | |
| MEETING ROOM B | | | | | | | | | | | |
| MEETING ROOM C | | | | | | | | | | | |

FIG. 4

| DATE | YEAR | MONTH | DAY | DAY OF THE WEEK | RESERVED MEETING ROOM | MEETING ROOM NAME | PERIOD | | START | END | MEETING NAME |
|---|---|---|---|---|---|---|---|---|---|---|---|
| | 2002 | 4 | 19 | | | | | | | | |
| MEETING ROOM NAME | PERIOD | | | | | | | | | | |
| | 8:00 – | 9:00 – | 10:00 – | 11:00 – | 12:00 – | 13:00 – | 14:00 – | 15:00 – | 16:00 – | 17:00 – | |
| MEETING ROOM 1 | | | | | | | | | | | |
| MEETING ROOM 2 | | | | | | | | | | | |
| MEETING ROOM 3 | | | | | | | | | | | |
| MEETING ROOM 4 | | | | | | | | | | | |
| MEETING ROOM 5 | | | | | | | | | | | |
| MEETING ROOM 6 | | | | | | | | | | | |
| MEETING ROOM 7 | | | | | | | | | | | |
| MEETING ROOM 8 | | | | | | | | | | | |
| MEETING ROOM 9 | | | | | | | | | | | |
| MEETING ROOM A | | | | | | | | | | | |
| MEETING ROOM B | | | | | | | | | | | |
| MEETING ROOM C | | | | | | | | | | | |

FIG. 5

| DATE | YEAR | MONTH | DAY | DAY OF THE WEEK | RESERVED MEETING ROOM | MEETING ROOM NAME | PERIOD | START | END | MEETING NAME |
|---|---|---|---|---|---|---|---|---|---|---|
| | 2002 | 4 | 19 | FRI | | | | | | |

| MEETING ROOM NAME | PERIOD | | | | | | | | |
|---|---|---|---|---|---|---|---|---|---|
| | 8:00 – | 9:00 – | 10:00 – | 11:00 – | 12:00 – | 13:00 – | 14:00 – | 15:00 – | 16:00 – 17:00 – |
| MEETING ROOM 1 | | | | | | | | | |
| MEETING ROOM 2 | | | | | | | | | |
| MEETING ROOM 3 | | | | | | | | | |
| MEETING ROOM 4 | | | | | | | | | |
| MEETING ROOM 5 | | | | | | | | | |
| MEETING ROOM 6 | | | | | | | | | |
| MEETING ROOM 7 | | | | | | | | | |
| MEETING ROOM 8 | | | | | | | | | |
| MEETING ROOM 9 | | | | | | | | | |
| MEETING ROOM A | | | | | | | | | |
| MEETING ROOM B | | | | | | | | | |
| MEETING ROOM C | | | | | | | | | |

FIG. 6

| DATE | YEAR | MONTH | DAY | DAY OF THE WEEK | RESERVED MEETING ROOM | MEETING ROOM NAME | PERIOD | | START | END | MEETING NAME |
|---|---|---|---|---|---|---|---|---|---|---|---|
| | 2002 | 4 | 19 | FRI | | MEETING ROOM 1 | | | 9:00 | 12:00 | REGULAR MEETING |

| MEETING ROOM NAME | PERIOD | | | | | | | | |
|---|---|---|---|---|---|---|---|---|---|
| | 8:00 – | 9:00 – | 10:00 – | 11:00 – | 12:00 – | 13:00 – | 14:00 – | 15:00 – | 16:00 – 17:00 |
| MEETING ROOM 1 | | | | ▓ | ▓ | ▓ | ▓ | ▓ | |
| MEETING ROOM 2 | | ▓ | ▓ | ▓ | | ▓ | ▓ | | |
| MEETING ROOM 3 | ▓ | ▓ | ▓ | ▓ | ▓ | ▓ | | | |
| MEETING ROOM 4 | ▓ | | | ▓ | ▓ | ▓ | ▓ | ▓ | |
| MEETING ROOM 5 | | | | ▓ | ▓ | ▓ | ▓ | | |
| MEETING ROOM 6 | | ▓ | ▓ | ▓ | ▓ | ▓ | ▓ | ▓ | |
| MEETING ROOM 7 | | ▓ | ▓ | ▓ | ▓ | | ▓ | ▓ | |
| MEETING ROOM 8 | ▓ | | | ▓ | | | | | |
| MEETING ROOM 9 | | | ▓ | ▓ | | | | ▓ | |
| MEETING ROOM A | | | | | | | | | |
| MEETING ROOM B | ▓ | ▓ | ▓ | ▓ | | | | | |
| MEETING ROOM C | | | | | | | | | |

FIG. 7

| DATE | YEAR | MONTH | DAY | DAY OF THE WEEK | RESERVED MEETING ROOM | MEETING ROOM NAME | PERIOD | | START | END | MEETING NAME |
|---|---|---|---|---|---|---|---|---|---|---|---|
| | 2002 | 4 | 19 | FRI | | MEETING ROOM 1 | | | 9:00 | 12:00 | REGULAR MEETING |

| MEETING ROOM NAME | PERIOD | | | | | | | | |
|---|---|---|---|---|---|---|---|---|---|
| | 8:00 – | 9:00 – | 10:00 – | 11:00 – | 12:00 – | 13:00 – | 14:00 – | 15:00 – | 16:00 – 17:00 |
| MEETING ROOM 1 | | | | | | | | | |
| MEETING ROOM 2 | | | | | | | | | |
| MEETING ROOM 3 | | | | | | | | | |
| MEETING ROOM 4 | | | | | | | | | |
| MEETING ROOM 5 | | | | | | | | | |
| MEETING ROOM 6 | | | | | | | | | |
| MEETING ROOM 7 | | | | | | | | | |
| MEETING ROOM 8 | | | | | | | | | |
| MEETING ROOM 9 | | | | | | | | | |
| MEETING ROOM A | | | | | | | | | |
| MEETING ROOM B | | | | | | | | | |
| MEETING ROOM C | | | | | | | | | |

FIG. 8

| CHECK BOX | ORGAN-IZATION | USER NAME | ACCOUNT NAME | PASS-WORD | DATE | 2002 | YEAR | 4 | MONTH | 19 | DAY | FRI | DAY OF THE WEEK | |
|---|---|---|---|---|---|---|---|---|---|---|---|---|---|---|
| | | | | | PERIOD | 8:00 – | 9:00 – | 10:00 – | 11:00 – | 12:00 – | 13:00 – | 14:00 – | 15:00 – | 16:00 – | 17:00 – |
| | ABC 1ST MEETING ROOM | ONO | ono | #### | PERIOD | | | | | | | | | | |
| | | | | | CHANNEL | | | 11ch | | | | 6ch | | | |
| | | | | | ENCIPHER KEY | | | **** | | | | **** | | | |
| | | | | | MEETING ROOM | | | MEETING ROOM 3 | | | | MEETING ROOM 2 | | | |
| | | | | | MEETING NAME | | | FRONT OFFICE MEETING | | | | SPECIFICATION STUDY MEETING | | | |
| | ABC 1ST MEETING ROOM | KUBO | kubo | #### | PERIOD | | | | | | | | | | |
| | | | | | CHANNEL | | | | | | | 6ch | | | |
| | | | | | ENCIPHER KEY | | | | | | | **** | | | |
| | | | | | MEETING ROOM | | | | | | | MEETING ROOM 2 | | | |
| | | | | | MEETING NAME | | | | | | | SPECIFICATION STUDY MEETING | | | |
| | ABC 1ST MEETING ROOM | NAKAMURA | nakamura | #### | PERIOD | | | | | | | | | | |
| | | | | | CHANNEL | | | | | | | | | | |
| | | | | | ENCIPHER KEY | | | | | | | | | | |
| | | | | | MEETING ROOM | | | | | | | | | | |
| | | | | | MEETING NAME | | | | | | | | | | |
| | ABC 1ST MEETING ROOM | MATSUDA | matsuda | #### | PERIOD | | | | | | | | | | |
| | | | | | CHANNEL | | | | | | | | | | |
| | | | | | ENCIPHER KEY | | | | | | | | | | |
| | | | | | MEETING ROOM | | | | | | | | | | |
| | | | | | MEETING NAME | | | | | | | | | | |
| | ABC 1ST MEETING ROOM | MIYAMOTO | miyamoto | #### | PERIOD | | | | | | | | | | |
| | | | | | CHANNEL | | 6ch | | | | | | | | |
| | | | | | ENCIPHER KEY | | **** | | | | | | | | |
| | | | | | MEETING ROOM | | MEETING ROOM 2 | | | | | | | | |
| | | | | | MEETING NAME | | THEME MEETING | | | | | | | | |

FIG. 9

| CHECK BOX | ORGAN-IZATION | USER NAME | ACCOUNT NAME | PASS-WORD | | DATE | 2002 | YEAR | 4 | MONTH | 19 | DAY | FRI | DAY OF THE WEEK | |
|---|---|---|---|---|---|---|---|---|---|---|---|---|---|---|---|
| | | | | | | PERIOD | 8:00 – | 9:00 – | 10:00 – | 11:00 – | 12:00 – | 13:00 – | 14:00 – | 15:00 – | 16:00 – | 17:00 – |
| ✓ | ABC 1ST MEETING ROOM | ONO | ono | #### | CHANNEL | | | | 11ch | | | | 6ch | | | |
| | | | | | ENCIPHER KEY | | | | **** | | | | **** | | | |
| | | | | | MEETING ROOM | | | | MEETING ROOM 3 | | | | MEETING ROOM 2 | | | |
| | | | | | MEETING NAME | | | | FRONT OFFICE MEETING | | | | SPECIFICATION STUDY MEETING | | | |
| ✓ | ABC 1ST MEETING ROOM | KUBO | kubo | #### | PERIOD | | | | | | | | 6ch | | | |
| | | | | | CHANNEL | | | | | | | | | | | |
| | | | | | ENCIPHER KEY | | | | | | | | **** | | | |
| | | | | | MEETING ROOM | | | | | | | | MEETING ROOM 2 | | | |
| | | | | | MEETING NAME | | | | | | | | SPECIFICATION STUDY MEETING | | | |
| ✓ | ABC 1ST MEETING ROOM | NAKAMURA | nakamura | #### | PERIOD | | | | | | | | | | | |
| | | | | | CHANNEL | | | | | | | | | | | |
| | | | | | ENCIPHER KEY | | | | | | | | | | | |
| | | | | | MEETING ROOM | | | | | | | | | | | |
| | | | | | MEETING NAME | | | | | | | | | | | |
| ✓ | ABC 1ST MEETING ROOM | MATSUDA | matsuda | #### | PERIOD | | | | | | | | | | | |
| | | | | | CHANNEL | | | | | | | | | | | |
| | | | | | ENCIPHER KEY | | | | | | | | | | | |
| | | | | | MEETING ROOM | | | | | | | | | | | |
| | | | | | MEETING NAME | | | | | | | | | | | |
| ✓ | ABC 1ST MEETING ROOM | MIYAMOTO | miyamoto | #### | PERIOD | | | | | | | | | | | |
| | | | | | CHANNEL | | | | 6ch | | | | | | | |
| | | | | | ENCIPHER KEY | | | | **** | | | | | | | |
| | | | | | MEETING ROOM | | | | MEETING ROOM 2 | | | | | | | |
| | | | | | MEETING NAME | | | | THEME MEETING | | | | | | | |

FIG. 10

| CHECK BOX | ORGAN-IZATION | USER NAME | ACCOUNT NAME | PASS-WORD | DATE | 2002 | YEAR | 4 | MONTH | 19 | DAY | FRI | DAY OF THE WEEK | | |
|---|---|---|---|---|---|---|---|---|---|---|---|---|---|---|---|
| | | | | | PERIOD | 8:00 – | 9:00 – | 10:00 – | 11:00 – | 12:00 – | 13:00 – | 14:00 – | 15:00 – | 16:00 – | 17:00 – |
| ✓ | ABC 1ST MEETING ROOM | ONO | ono | #### | PERIOD | | | | | | | | | | |
| | | | | | CHANNEL | | 1ch | | 11ch | | | 6ch | | | |
| | | | | | ENCIPHER KEY | | **** | | **** | | | **** | | | |
| | | | | | MEETING ROOM | | 1 | | MEETING ROOM 3 | | | MEETING ROOM 2 | | | |
| | | | | | MEETING NAME | | REGULAR MEETING | | FRONT OFFICE MEETING | | | SPECIFICATION STUDY MEETING | | | |
| ✓ | ABC 1ST MEETING ROOM | KUBO | kubo | #### | PERIOD | | | | | | | | | | |
| | | | | | CHANNEL | | 1ch | | | | | 6ch | | | |
| | | | | | ENCIPHER KEY | | **** | | | | | **** | | | |
| | | | | | MEETING ROOM | | MEETING ROOM 1 | | | | | MEETING ROOM 2 | | | |
| | | | | | MEETING NAME | | REGULAR MEETING | | | | | SPECIFICATION STUDY MEETING | | | |
| ✓ | ABC 1ST MEETING ROOM | NAKAMURA | nakamura | #### | PERIOD | | | | | | | | | | |
| | | | | | CHANNEL | | 1ch | | | | | | | | |
| | | | | | ENCIPHER KEY | | **** | | | | | | | | |
| | | | | | MEETING ROOM | | MEETING ROOM 1 | | | | | | | | |
| | | | | | MEETING NAME | | REGULAR MEETING | | | | | | | | |
| ✓ | ABC 1ST MEETING ROOM | MATSUDA | matsuda | #### | PERIOD | | | | | | | | | | |
| | | | | | CHANNEL | | 1ch | | | | | | | | |
| | | | | | ENCIPHER KEY | | **** | | | | | | | | |
| | | | | | MEETING ROOM | | MEETING ROOM 1 | | | | | | | | |
| | | | | | MEETING NAME | | REGULAR MEETING | | | | | | | | |
| ✓ | ABC 1ST MEETING ROOM | MIYAMOTO | miyamoto | #### | PERIOD | | | | | | | | | | |
| | | | | | CHANNEL | | 6ch | | 1ch | | | | | | |
| | | | | | ENCIPHER KEY | | **** | | ***** | | | | | | |
| | | | | | MEETING ROOM | | MEETING ROOM 2 | | 1 | | | | | | |
| | | | | | MEETING NAME | | THEME MEETING | | REGULAR MEETING | | | | | | |

FIG. 11

| MEETING ROOM NAME | ACCESS POINT NAME | IP ADDRESS | USED CHANNEL | NUMBER OF AVAILABLE AP |
|---|---|---|---|---|
| MEETING ROOM 1 | AP1 | 192.168.0.1 | ch1 | 1 |
| MEETING ROOM 2 | AP2 | 192.168.0.2 | ch6 | 1 |
| MEETING ROOM 3 | AP3 | 192.168.0.3 | ch11 | 1 |
| MEETING ROOM 4 | AP4 | 192.168.0.4 | ch14 | 1 |
| MEETING ROOM 5 | AP5 | 192.168.0.5 | ch2 | 1 |
| MEETING ROOM 6 | AP6 | 192.168.0.6 | ch7 | 1 |
| MEETING ROOM 7 | AP7 | 192.168.0.7 | ch12 | 1 |
| MEETING ROOM 8 | AP8 | 192.168.0.8 | ch3 | 1 |
| MEETING ROOM 9 | AP9 | 192.168.0.9 | ch8 | 1 |
| MEETING ROOM A | AP10 | 192.168.0.10 | ch4 | 2 |
| MEETING ROOM A | AP11 | 192.168.0.11 | ch9 | 2 |
| MEETING ROOM B | AP12 | 192.168.0.12 | ch5 | 2 |
| MEETING ROOM B | AP13 | 192.168.0.13 | ch10 | 2 |
| MEETING ROOM C | AP14 | 192.168.0.14 | ch1 | 2 |
| MEETING ROOM C | AP15 | 192.168.0.15 | ch6 | 2 |

FIG. 12

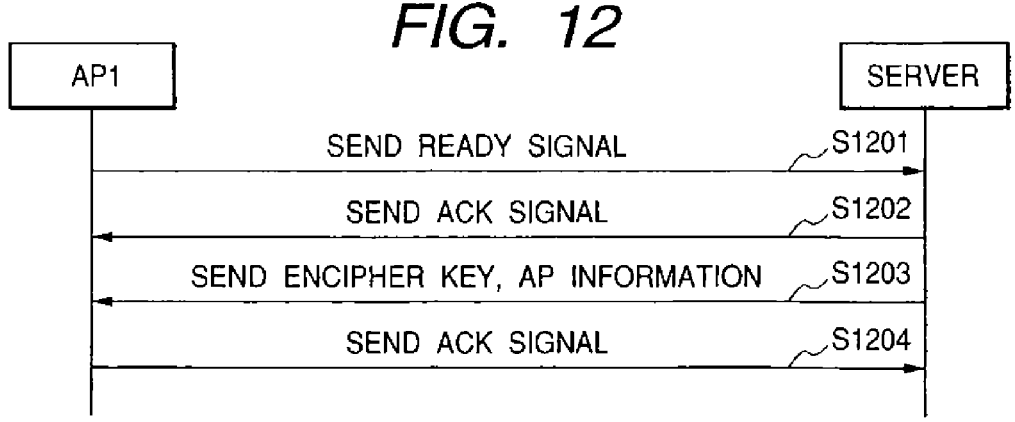

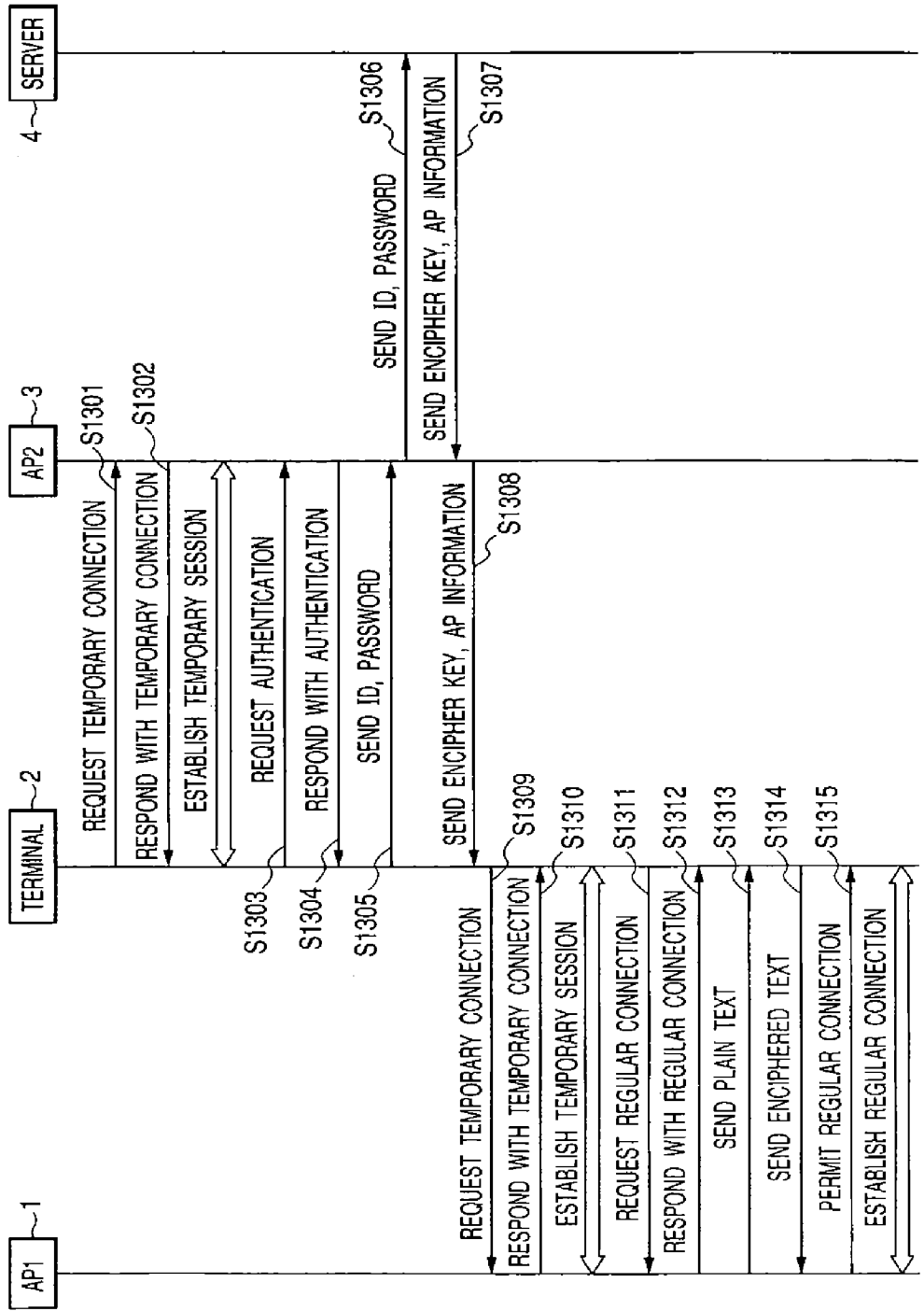

| ORGANIZATION | USER NAME | ACCOUNT NAME | PASSWORD |
|---|---|---|---|
| ABC 1ST MEETING ROOM | NAKAMURA | nakamura | #### |

FIG. 20

| DATE | YEAR | MONTH | DAY | DAY OF THE WEEK | RESERVED MEETING ROOM | MEETING ROOM NAME | PERIOD | START | END | MEETING NAME |
|---|---|---|---|---|---|---|---|---|---|---|
| | 2002 | 4 | 19 | FRI | | MEETING ROOM A | | 9:00 | 12:00 | REGULAR MEETING |
| MEETING ROOM NAME | 8:00 – | 9:00 – | 10:00 – | 11:00 – | 12:00 – | 13:00 – | 14:00 – | 15:00 – | 16:00 – | 17:00 – |
| MEETING ROOM 1 | | | | | | | | | | |
| MEETING ROOM 2 | | | | | | | | | | |
| MEETING ROOM 3 | | | | | | | | | | |
| MEETING ROOM 4 | | | | | | | | | | |
| MEETING ROOM 5 | | | | | | | | | | |
| MEETING ROOM 6 | | | | | | | | | | |
| MEETING ROOM 7 | | | | | | | | | | |
| MEETING ROOM 8 | | | | | | | | | | |
| MEETING ROOM 9 | | | | | | | | | | |
| MEETING ROOM A | | | | | | | | | | |
| MEETING ROOM B | | | | | | | | | | |
| MEETING ROOM C | | | | | | | | | | |

FIG. 21

| DATE | | | | RESERVED MEETING ROOM | MEETING ROOM NAME | PERIOD | | | MEETING NAME |
|---|---|---|---|---|---|---|---|---|---|
| YEAR | MONTH | DAY | DAY OF THE WEEK | | | | START | END | |
| 2002 | 4 | 19 | FRI | | MEETING ROOM A | PERIOD | 9:00 | 12:00 | REGULAR MEETING |
| MEETING ROOM NAME | 8:00 – | 9:00 – | 10:00 – | 11:00 – | 12:00 – | 13:00 – | 14:00 – | 15:00 – | 16:00 – | 17:00 – |
| MEETING ROOM 1 | | | | | | | | | | |
| MEETING ROOM 2 | | | | | | | | | | |
| MEETING ROOM 3 | | | | | | | | | | |
| MEETING ROOM 4 | | | | | | | | | | |
| MEETING ROOM 5 | | | | | | | | | | |
| MEETING ROOM 6 | | | | | | | | | | |
| MEETING ROOM 7 | | | | | | | | | | |
| MEETING ROOM 8 | | | | | | | | | | |
| MEETING ROOM 9 | | | | | | | | | | |
| MEETING ROOM A | | | | | | | | | | |
| MEETING ROOM B | | | | | | | | | | |
| MEETING ROOM C | | | | | | | | | | |

FIG. 22

| CHECK BOX | ORGAN-IZATION | USER NAME | ACCOUNT NAME | PASS-WORD | | DATE | 2002 | YEAR | 4 | MONTH | 19 | DAY | FRI | DAY OF THE WEEK | |
|---|---|---|---|---|---|---|---|---|---|---|---|---|---|---|---|
| | | | | | | PERIOD | 8:00 – | 9:00 – | 10:00 – | 11:00 – | 12:00 – | 13:00 – | 14:00 – | 15:00 – | 16:00 – | 17:00 – |
| ✓ | ABC 1ST MEETING ROOM | ONO | ono | #### | PERIOD | | | | | | | | | | | |
| | | | | | CHANNEL | | | 11ch | | | | 6ch | | | |
| | | | | | ENCIPHER KEY | | | **** | | | | **** | | | |
| | | | | | MEETING ROOM | | | A | MEETING ROOM 3 | | | MEETING ROOM 2 | | | |
| | | | | | MEETING NAME | | | REGULAR MEETING | FRONT OFFICE MEETING | | | SPECIFICATION STUDY MEETING | | | |
| ✓ | ABC 1ST MEETING ROOM | KUBO | kubo | #### | PERIOD | | | | | | | | | | | |
| | | | | | CHANNEL | | | | | | | 6ch | | | |
| | | | | | ENCIPHER KEY | | | | | | | **** | | | |
| | | | | | MEETING ROOM | | | MEETING ROOM A | | | | MEETING ROOM 2 | | | |
| | | | | | MEETING NAME | | | REGULAR MEETING | | | | SPECIFICATION STUDY MEETING | | | |
| ✓ | ABC 1ST MEETING ROOM | NAKAMURA | nakamura | #### | PERIOD | | | | | | | | | | | |
| | | | | | CHANNEL | | | | | | | | | | |
| | | | | | ENCIPHER KEY | | | | | | | | | | |
| | | | | | MEETING ROOM | | | MEETING ROOM A | | | | | | | |
| | | | | | MEETING NAME | | | REGULAR MEETING | | | | | | | |
| ✓ | ABC 1ST MEETING ROOM | MATSUDA | matsuda | #### | PERIOD | | | | | | | | | | | |
| | | | | | CHANNEL | | | | | | | | | | |
| | | | | | ENCIPHER KEY | | | | | | | | | | |
| | | | | | MEETING ROOM | | | MEETING ROOM A | | | | | | | |
| | | | | | MEETING NAME | | | REGULAR MEETING | | | | | | | |
| ✓ | ABC 1ST MEETING ROOM | MIYAMOTO | miyamoto | #### | PERIOD | | | | | | | | | | | |
| | | | | | CHANNEL | | | 6ch | | | | | | | |
| | | | | | ENCIPHER KEY | | | **** | | | | | | | |
| | | | | | MEETING ROOM | | | MEETING ROOM 2 | A | | | | | | |
| | | | | | MEETING NAME | | | THEME MEETING | REGULAR MEETING | | | | | | |

FIG. 28

| ACCESS POINT NAME | room203 |
|---|---|
| WIRELESS CHANNEL | 11ch |
| DATE | 2002/4/27 |
| START TIME | 13:00 |
| END TIME | 15:30 |
|  |  |
| PARTICIPANT 1 (ACCOUNT NAME) | yamada_hanako |
| PARTICIPANT 2 (ACCOUNT NAME) | suzuki_ichiro |
| PARTICIPANT 3 (ACCOUNT NAME) | fujita_shigeru |
| PARTICIPANT 4 (ACCOUNT NAME) | kobayashi_tatsuya |
| PARTICIPANT 5 (ACCOUNT NAME) | yamada_taro |
| . . . . |  |

COMMUNICATION SYSTEM, INFORMATION PROCESSING DEVICE, CONNECTION DEVICE, AND CONNECTION DEVICE DESIGNATION METHOD FOR DESIGNATING CONNECTION DEVICE FOR COMMUNICATION DEVICE TO CONNECT TO

CROSS-REFERENCE TO RELATED APPLICATION

This application is a divisional of application Ser. No. 12/368,899, filed Feb. 10, 2009; which is a divisional of application Ser. No. 10/799,011, filed Mar. 12, 2004, now U.S. Pat. No. 7,620,027, the entire disclosures of which are hereby incorporated by reference.

BACKGROUND OF THE INVENTION

1. Field of the Invention

The present invention relates to a communication system, an information processing device, a connection device, and a connection device designation method for designating the connection device for communication device to connect to.

2. Related Background Art

Conventionally, a wireless communication system utilizing a wireless LAN defined by IEEE 802.11 is constructed with at least an access point (hereinafter referred to as "AP") that serves as a wireless base station, and a plurality of wireless LAN terminals. Wireless communications are conducted in an infrastructure mode. The term "infrastructure mode" refers to a communication method in which the AP mediates communications among the wireless LAN terminals, instead of having the wireless LAN terminals conduct direct communications with each other.

The wireless communication system may include a plurality of APs. In this case, in order for a wireless LAN terminal to conduct communications through a particular AP, the initial settings in the wireless LAN terminal must be set with an Extended Service Set Identifier (ESSID) or another ID number that has been set in the particular AP to distinguish it.

For example, the identical ESSID may be used to form a single, closed network connecting an AP arranged in a specific area where meetings are held (e.g., a meeting room) and various wireless LAN terminals that meeting attendees respectively bring to the meeting. Exchanges of data necessary for conducting the meeting can be performed via the wireless LAN. A "closed network" means that the network cannot be accessed from wireless LAN terminals other than those used by the attendees in the meeting (PAN: Personal Area Network).

However, when using the ESSID to specify the particular AP to build a conferencing system as in the above-mentioned conventional wireless communication system, each attendee must reconfigure the wireless LAN terminal that he or she will bring to the meeting with the ESSID designated for the AP to be used at the next meeting. This was an extremely burdensome aspect of constructing the conferencing system.

Furthermore, when using such a conferencing system, there is a case where multiple APs are to be used in a single meeting and the wireless LAN terminals connecting to these APs need to be distributed evenly. In such a case, a different ESSID needs to be assigned in advance to each AP, and the ESSIDs assigned to the APs need to be distributed to the wireless LAN terminals of the meeting attendees evenly so as to prevent communications traffic from getting concentrated at a particular AP. Conventionally, it has not been possible to perform even distribution of the ESSIDs in an automated fashion.

Moreover, in a case where a connection was incorrectly made to an AP in a neighboring meeting room, for example, the user would have to change the access point and try to connect to a different network. Each time this action is taken, the user must change the SSID set in his or her terminal, or must pre-set the terminal with as many SSIDs as there are networks, which is burdensome.

SUMMARY OF THE INVENTION

An object of the present invention is to solve the above-mentioned problems.

Another object of the present invention is to enable easy connection to an intended connection device, even when a plurality of connection devices exist.

Yet another object of the present invention is to enable a communication device to connect to a desired connection device even after first connecting to a connection device other than the desired one.

Further other objects of the present invention will become clear in the following specification and drawings.

BRIEF DESCRIPTION OF THE DRAWINGS

FIG. 3 is a diagram showing an example of a meeting room reservation screen sent at step S207 in FIG. 2 and displayed on a display device of a terminal;

FIG. 4 is a diagram showing an example of the meeting room reservation screen with a date of usage inserted into a date field at step S208 in FIG. 2;

FIG. 5 is a diagram showing an example of a reservation status screen sent from the server to a terminal at step S209 in FIG. 2;

FIG. 6 is a diagram showing the reservation status screen filled in with a meeting room name, a time to start the meeting, a time to end it, and a meeting name which the user wishes to reserve;

FIG. 7 is a diagram showing an example of a screen displayed on the display device of the terminal according to a response with a meeting room reservation request sent from the server to the terminal at step S211 in FIG. 2;

FIG. 8 is diagram showing an example of user database information sent from the server to the terminal at step S212 in FIG. 2;

FIG. 9 is a diagram showing an example of user database information in which users who will be allowed to attend the meeting are selected in check boxes;

FIG. 10 is a diagram showing database information set with a meeting time frame, a meeting room name, a meeting name, an encipher key, and a channel;

FIG. 11 is a diagram showing an example of AP information per meeting room registered in the server as a database;

FIG. 12 is a communications sequence diagram showing processing for sending a notification regarding meeting room reservation information, which is conducted between the server and the AP arranged in the reserved meeting room after the meeting organizer has made the meeting reservation with the server;

FIG. 13 is a sequence diagram showing connection processing which is conducted between a wireless LAN terminal in the network system (conferencing system) shown in FIG. 1, an AP 1 arranged in a meeting room 1, an AP 2 arranged in a meeting room 2, and a server connected to a backbone LAN;

FIG. 20 is a diagram showing an example of the reservation status screen filled in with 2002/4/19 as the reservation time, meeting room A with 2 APs as the desired meeting room, 9 am as the meeting start time, 12 noon as the meeting end time, and "regular meeting" as the meeting name;

FIG. 21 is a diagram showing an example of a screen of a response with a meeting room reservation request, which the server returns to the meeting organizer's terminal after receiving the reservation status screen data shown in FIG. 20;

FIG. 22 is a diagram showing an example of database information of Embodiment 3, which corresponds to the database information of Embodiment 1 that was shown in FIG. 10;

FIG. 28 is an outline diagram showing an example of registration information 2800 that is registered into an EEPROM 2706 in the access point shown in FIG. 27;

DESCRIPTION OF THE PREFERRED EMBODIMENTS

Below, explanation is given regarding embodiments of the present invention, with reference to the drawings.

Embodiment 1

Figure 1:
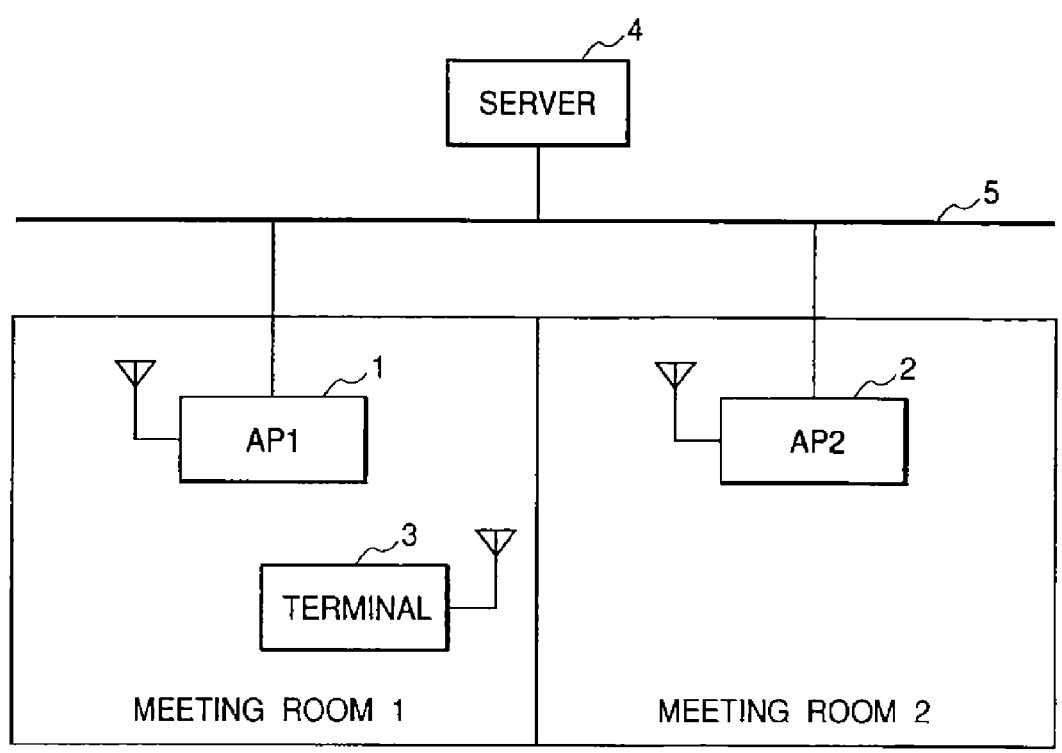
FIG. 1 is a block diagram showing a configuration of Embodiment 1 of a network system (conferencing system) in accordance with the present invention.

FIG. 1 is a block diagram showing a configuration of Embodiment 1 of a network system (conferencing system) in accordance with the present invention. It is assumed here that this network system is being applied in a meeting room.

In the diagram, reference numerals 1 and 2 each indicate an access point (hereinafter referred to as "AP") for a wireless LAN to access to. Reference numeral 3 indicates a wireless LAN terminal for performing wireless communications with the APs 1 and 2. Reference numeral 4 indicates a server having an authentication function and a database function. Reference numeral 5 indicates a backbone LAN for connecting the APs 1 and 2 with the server 4. In this diagram, the APs 1 and 2 are each installed in adjacent but different meeting rooms, and they are always connected to the backbone LAN 5.

In the conferencing system in accordance with this embodiment, attendees of a meeting each bring a wireless LAN terminal, and form a PAN (Personal Area Network) with the AP that is installed in the meeting room for usage with wireless LANs. Accordingly, data exchanges necessary for conducting the meeting can be performed via the wireless LAN. In order to perform the wireless LAN communications that are used in this conferencing system, it is assumed that a wireless LAN connection method defined by IEEE 802.11b is being used.

To connect to the wireless LAN, there is a connection method called an ad hoc mode, in which the wireless LAN terminals directly communicate with each other, and an infrastructure mode, in which the AP mediates communications among the wireless LAN terminals. In this embodiment, the infrastructure mode is used because a conferencing system has been constructed by means of a communication method that utilizes the AP.

When using the infrastructure mode, a number of items must be set in the initial settings of both the AP and the wireless LAN terminal. In the AP, it is necessary to set: a frequency band to be used for the wireless communications; an ID number, called an SSID (Service Set Identifier) or ESSID (Extended Service Set Identifier), for grouping together the wireless LAN terminals connected to the AP; and a enciphering key called a WEP (Wired Equivalent Privacy). Note that when using the wireless LAN, selection of the channel also allows selection of the frequency band used for that channel. The number of channels can be from 1 channel to 14 channels, and the number of usable channels (frequency bands) varies by country and region.

Like the AP itself, the wireless LAN terminals that are connected to the AP must also be set with the SSID or the ESSID ID number, and the WEP enciphering key.

In order to connect the AP and the wireless LAN terminal to each other, the SSID or ESSID identification number must be set to the same value in both the AP and in the wireless LAN terminal. However, it is also possible to leave the ID numbers in both of them blank (i.e., unset). Furthermore, if there is no need to guarantee security between the AP and the wireless LAN terminal, or if security is configured at a higher level, the WEP enciphering key may also be left blank (unset) in both the AP and the wireless LAN terminal. However, if the SSID (ESSID) is not set in the wireless LAN terminal, then when that wireless LAN terminal makes access for the first time to an AP that is not set with the SSID (ESSID), or when it makes access for the first time to an AP which is configured to accept a wireless LAN terminal that is not set with the SSID (ESSID), the wireless LAN terminal will establish the connection with the AP it accessed for the first time. Therefore, when connecting to a particular AP, the ID number and the enciphering keys must not be left blank (unset), and the same ID number and enciphering key must be set to the same value in both the AP and the wireless LAN terminal.

In this embodiment, it is possible to connect to the desired AP even without setting the SSID (ESSID) and WEP in the wireless LAN terminal. On the wireless LAN terminal side, the items for setting the SSID (ESSID) and WEP are left blank (unset). On the AP side as well, the items for setting SSID (ESSID) and WEP are left blank so that the wireless LAN terminal without the SSID (ESSID) and WEP settings can connect to the AP.

Figure 2:
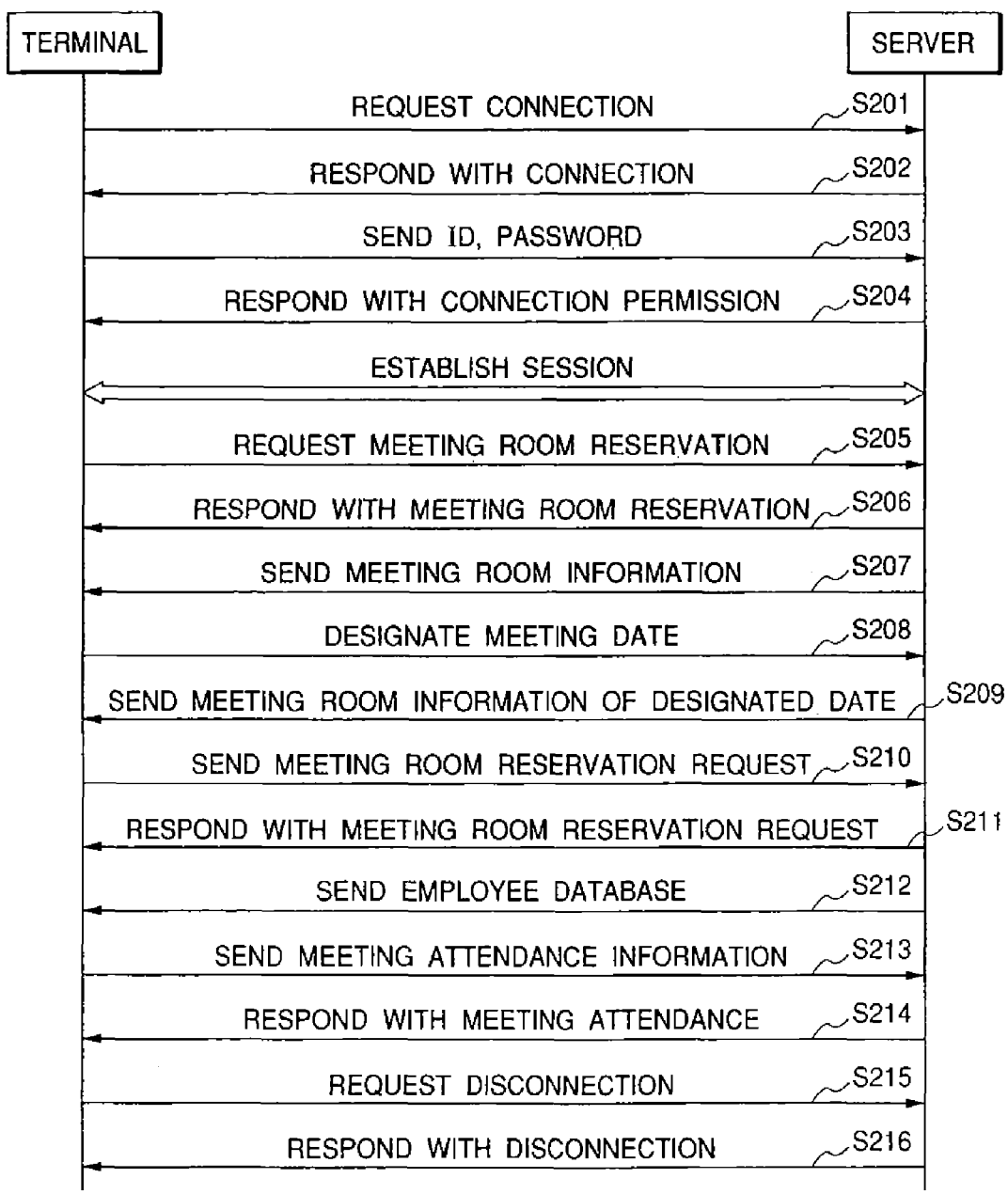
FIG. 2 is a sequence diagram showing communication processing to reserve a meeting room and register a meeting attendee, which takes place between a terminal of a meeting organizer and a server having an authentication function and a database function.

FIG. 2 is a sequence diagram showing communication processing to reserve a meeting room and register a meeting attendee, which takes place between a terminal of a meeting organizer and a server that has an authentication function and a database function (this server corresponds to the server 4 in FIG. 1). The above-mentioned terminal used by the meeting organizer corresponds to either the wireless LAN terminal 3 shown in FIG. 1, or a PC (Personal Computer) which is not shown in the diagram but is connected by a wire cable (or wirelessly) via the backbone LAN 5 to the server 4, or the like. Note that in the discussion here the number of meeting rooms and the number of APs do not correspond to FIG. 1.

FIGS. 3 to 7 show various reservation screens used when the meeting organizer reserves the meeting room by communicating with the server from the wireless LAN terminal, the PC, or the like. These reservation screens are displayed on a display device of the wireless LAN terminal, the PC, etc.

FIGS. 8 to 10 show various registration screens used when the meeting organizer registers the meeting attendees for the meeting by communicating with the server 4 from the wireless LAN terminal 3, the PC or the like. These registration screens are displayed on a display device of the wireless LAN terminal 3, the PC, etc. Note that also in the discussion here the number of meeting rooms and the number of APs do not correspond to FIG. 1.

Below, an explanation is given regarding the communications processing focusing on the sequence shown in FIG. 2, with reference to FIG. 3 to FIG. 10 as necessary.

At step S201 in FIG. 2, the terminal designates the server's IP address and sends a connection request to the server. At step S202, in response with the connection request sent at step S201, the server sends a connection response accepting the request back to the terminal that sent the connection request.

The meeting organizer uses an input device to input, into his or her own terminal, his or her account name (ID) and password, which are registered in advance in a database inside the server. This database is described below, with reference to FIG. 8.

At step S203, the terminal sends the inputted account name and password to the server. At step S204, the server determines whether or not the account name and password of the owner of the terminal from which the account name and password were sent match those registered in the database inside the server. If they do match, then a response granting connection permission is returned to the terminal. Accordingly, a session (communication means) is established between the terminal and the server.

At step S205, the terminal sends the server a request for a meeting room reservation. At step S206, the server notifies the terminal that it received the reservation request at step S205. At step S207, the server sends data for a meeting room reservation screen to the terminal.

FIG. 3 shows an example of a meeting room reservation screen sent at step S207 and displayed on the display screen of the terminal. The meeting room display screen shown in FIG. 3 is made of items for a planned date of usage, the name of the meeting room to be reserved, the time frame of the reservation, and a meeting name.

At step S208, from his or her own terminal's input device the meeting organizer inputs the planned date of usage into the date field in the meeting room reservation screen, and then the terminal sends that information to the server. FIG. 4 is a diagram showing an example of the meeting room reservation screen with the usage date inputted to the date field at step S208.

At step S209, the server sends the terminal a reservation status screen indicating the reservation status of the meeting room on the day corresponding to the planned date of usage that was sent from the terminal at step S208.

FIG. 5 is a diagram showing an example of a reservation status screen sent from the server to the terminal at step S209. In this reservation status screen, the rectangular graphs for each meeting room indicate time frames during which reservations are already scheduled.

At step S210, from his or her terminal's input device, the meeting organizer inputs a name of a meeting room, a meeting start time, a meeting end time, and a meeting name which he or she wants to reserve, into the appropriate fields in the reservation status screen. This inputted information is sent from the terminal to the server. FIG. 6 is a diagram showing an example of a reservation status screen filled in with the meeting room name, the meeting start time, the meeting end time, and the meeting name which the meeting organizer wishes to reserve.

At step S211, the server compares information of the desired meeting room name, meeting start time, meeting end time, and meeting name against meeting room reservation status information in the database inside the server, to confirm whether that meeting room is available for the date and time frame that were inputted. Then, if it is available, a response with the meeting room reservation request is sent to the terminal.

FIG. 7 is a diagram showing an example of a screen displayed on the display device of the terminal according to the response with the meeting room reservation request sent from the server to the terminal at step S211. In FIG. 7, the rectangular graph is plotted in the desired time frame for the meeting room desired by the meeting organizer. This indicates that the given meeting room is reserved during the given time frame.

At step S212, the server sends the user database information to the terminal.

FIG. 8 is diagram showing the user database information sent from the server to the terminal at step S212.

Information pertaining to every user who can use the meeting rooms is registered in the database of the server. From among these users, the meeting organizer designates a desired group (section). Thus, the database information pertaining to each user in the designated group (section) is extracted and sent, as the above-mentioned user database information, from the server to the terminal.

As shown in FIG. 8, the user information includes the name of the user's organization, a user name, and each user's account name and password which are used for performing authentication with the server. The time frame field associated with each user indicates each user's schedule to use each of the meeting rooms. The time frame field of each user also indicates the wireless LAN channel to be used in the meeting and the encipher key (which is used to encrypt data). Here, each user's password and encipher key is represented in the diagram by the same symbol, but in actuality they would be different symbols for each user. On the other hand, in this embodiment, the encipher key used by each attendee in the same meeting is the same.

The meeting organizer at the terminal who receives the above-mentioned user database information from the server selects the user(s) who he or she wants to have present at the meeting. More specifically, the meeting organizer selects the users who are desired to be the meeting attendees the meeting by placing a check in the check box at the far left side of the screen shown in FIG. 8 using his or her terminal's input device. At step S213, selection information indicating the users thus selected who are desired to be the meeting attendees is sent from the terminal to the server. FIG. 9 is a diagram showing an example of the user database information for the users who are desired to be the meeting attendees who were selected through the check boxes.

At step S214, based on the meeting attendance user information (exemplified in FIG. 9) sent from the terminal at step S213, and the response with the meeting room reservation request (exemplified in FIG. 7) sent from the server to the terminal at step S211, the server sets the time frame to hold the meeting, a meeting room name, a meeting name, and the encipher key and channel to use with the wireless LAN into the database information of the users who will attend the meeting. As described below with reference to FIG. 11, the wireless LAN channels to be used at meetings are determined per meeting room (location) so as not to interfere with frequencies (channels) used by other APs in the vicinity. These channels are determined automatically at the time when the meeting rooms are selected. Furthermore, the encipher key to be used with the wireless LAN is adjusted by the server so as not to overlap with the encipher keys used in other meetings taking place during the same time frame. The database information that has been set as described here is then sent from the server to the terminal, as a response with the meeting attendance.

FIG. 10 is a diagram showing an example of the database information, which has been set as described above with the meeting time frame, the meeting room name, the meeting name, the encipher key, and the channel.

In the database information shown in FIG. 10, for each user whose check box is checked, there is set the time frame flag, the meeting room name, the meeting name, the channel, and the encipher key that will be used for the new meeting which has just been added.

Note that, in this embodiment, when the terminal that the meeting attendee (user) brings is a wireless LAN terminal, the same value is used as the encipher key for all the meeting attendees. However, the encipher key may also be different for each user.

Further, the information which the terminal received from the server at step S212 (exemplified in FIG. 8) lists users who are desired to be the meeting attendees, but there are instances where one of these user's schedule is already filled with another meeting during the time frame when the meeting is going to be held. In such a case, this user can be double-booked for two meetings. The meeting attendee will decide which of the double-booked meetings to attend. This is explained below referencing FIG. 14 to FIG. 16.

At step S215, the meeting organizer has completed the setting of the meeting and sends a disconnection (logoff) request from the terminal to the server. The server receives this, and at step S216 the server responds with the disconnection. Accordingly, the session between the terminal and the server is ended, and the communications sequence shown in FIG. 2 ends.

FIG. 11 is a diagram showing an example of AP information per meeting room, which is registered in the server as a database.

AP information is registered for each meeting room as a database in the server. The AP information includes an AP name, the IP address assigned to the AP, the wireless LAN channel to be used in the meeting room, and the maximum number of APs that can be used in the meeting room.

In the example shown in FIG. 11, a maximum of 2 APs can be placed in each of the 3 meeting rooms A, B, and C. The AP name, IP address, and channel for each AP are also assigned.

FIG. 12 is a communications sequence diagram showing processing for sending a notification of the meeting room reservation information. This communications sequence is conducted after the meeting organizer has made the meeting reservation with the server, and is conducted between the server and the AP arranged in the reserved meeting room.

Here, explanations will be given regarding an example in which the reservation information about reserving the meeting room 1 from 9 am until 12 noon (see FIG. 7) is sent from the server to the access point AP 1 installed in the meeting room 1. This communications sequence is started immediately after a main power source for the AP 1 is turned on.

All the APs are equipped with a nonvolatile memory, and the server's IP address is pre-stored in this nonvolatile memory. At step S1201, the AP 1 reads the server's IP address stored in the nonvolatile memory, and designates this IP address to connect to the server. The AP 1 sends a Ready signal to notify the server that it's own power source has been turned on and the AP 1 is operational. After the server receives the Ready signal from the AP 1, at step S1202 the server sends the AP 1 an Ack (Acknowledge) signal, which is a response signal, to inform the AP 1 that the server has received the Ready signal.

At step S1203, the server then extracts the meeting name and channel scheduled to be used for the IP address of the AP 1 that sent the Ready signal, from the AP information such as that shown in FIG. 11. Further, the server also references the database information such as that shown in FIG. 10 and extracts the encipher key corresponding to the meeting name that was already extracted. The server then sends the extracted channel and encipher key to the AP 1.

Note that, the information sent from the server to the AP 1 at step S1203 are not the ones for all the meetings scheduled to be held in the meeting room 1 where the AP 1 is installed. Rather, they are the channels and encipher keys for meetings that are scheduled to be held during or after the time when the Ready signal is received from the AP 1. For example, whether the server received the Ready signal on 2002/4/19 at 8:50 am, or received on the same day at 9:10 am, the server would still send to the AP 1 the channels and encipher keys for the meeting from 9 am to 12 noon, the channel and key used for the meeting from 12 noon until 2 pm, and the channel and key for the meeting from 2 pm until 5 pm (see FIG. 7).

At step S1204, if the information sent from the server at step S1203 is received correctly, then the AP 1 sends the Ack signal to the server.

FIG. 13 is a sequence diagram showing connection processing which is conducted by the wireless LAN terminal in the network system (conferencing system) shown in FIG. 1, the AP 1 installed in a meeting room 1, the AP 2 installed in a meeting room 2, and the server 4 which is connected to the backbone LAN 5. Here, it is assumed that meeting room 1 and meeting room 2 are adjacent to each other, and the radio waves from the AP 2 installed in the meeting room 2 can be received in the meeting room 1.

This processing is started when the meeting organizer turns on the wireless LAN terminal 3 that he or she has brought and loads the conferencing application software, which is stored in the wireless LAN terminal 3. In order to enable the wireless LAN terminal 3 to receive the radio waves sent by the AP 1 and the AP 2, the user typically selects and tunes into the 14 channels used by the wireless LAN one at a time searching for the channel where the radio waves can be received.

Assuming the radio waves emitted by, for example, the AP 2 were received on a certain channel, the wireless LAN terminal 3 then detects that the radio waves are from the AP 2 based on information contained in the received radio waves, and then sends a temporary connection request to the AP 2 at step S1301. At step S1302, the AP 2 responds to the temporary connection request from the wireless LAN terminal 3 with a temporary connection, whereby a temporary session is established between the wireless LAN terminal 3 and the AP 2. Note that, the SSID is not set in either the wireless LAN terminal 3 or in the AP 2. Therefore, the temporary connection request includes an SSID for performing authentication, but there is no step in which this SSID is authenticated.

At step S1303, the wireless LAN terminal 3 sends an authentication request to the AP 2 in order to be authenticated by the server. At step S1304, the AP 2 responds to the wireless LAN terminal 3 with authentication indicating that it received the authentication request from the wireless LAN terminal 3.

At the wireless LAN terminal 3 that received the authentication response from the AP 2, the meeting organizer using that terminal inputs the account name serving as his or her own ID and the password via the input device of the wireless LAN terminal 3. At step S1305, the wireless LAN terminal 3 sends this inputted account name and password to the AP 2. At step S1306, the AP 2 sends to the server 4 the account name (ID) and password of the wireless LAN terminal 3 which were received from the wireless LAN terminal 3.

After the server 4 receives this transmission, the server 4 references the data base (exemplified in FIG. 10) which is in the server 4 and searches for a meeting reservation which corresponds to the account name (ID) and password that were received. If such a meeting reservation exists, then the server 4 extracts the encipher key and wireless LAN channel to be used at that meeting (i.e., the AP information). According to the network system (conferencing system) example shown in FIG. 1, the server 4 would extract the encipher key and channel 1 (channel used by the AP 1) used for the meeting in the meeting room 1.

At step S1307, the server 4 sends the extracted encipher key and wireless LAN channel to the AP 2. At step S1308, the AP 2 sends the encipher key and wireless LAN channel that were sent from the server 4 to the wireless LAN terminal 3.

At step S1309, the wireless LAN terminal 3 sends the temporary connection request for the channel received from the AP 2 (i.e., the channel that is used by the AP 1) to the AP 1. At step S1310, the AP 1 responds with a temporary connection in response with the temporary connection request from the wireless LAN terminal 3. Accordingly, a temporary session is established between the wireless LAN terminal 3 and the AP 1.

At step S1311, the wireless LAN terminal 3 sends a regular connection request to the AP 1. At step S1312, having received the regular connection request, the AP 1 responds with a regular connection the wireless LAN terminal 3.

At step S1313, the AP 1 sends a predetermined plain text document to the wireless LAN terminal 3. The wireless LAN terminal 3 receives the predetermined document and uses the encipher key received from the AP 2 at step S1308 to convert the document into code, and at step S1314 sends the enciphered text to the AP 1.

Having received the enciphered text, the AP 1 uses the encipher key received from the server 4 in the communications sequence (S1203) shown in FIG. 12 to return the enciphered text to plain text. Then the AP 1 compares the plain text with the predetermined document sent to the wireless LAN terminal 3 at step S1313. If they are the same, then at step S1315 the AP 1 sends a regular connection permission signal to the wireless LAN terminal 3, and thus a regular session is established.

Note that, the above-mentioned temporary session means that communications have only been established between the wireless LAN terminal and the AP. Thus, in the temporary session the data sent from the wireless LAN terminal cannot be sent past the AP to the backbone LAN side. Also, for the backbone LAN side, during the temporary session the LAN cannot know whether or not the wireless LAN terminal is present. Therefore, the backbone LAN cannot send data to the wireless LAN terminal. The above-mentioned regular session refers to a state where sending and receiving can be performed between the wireless LAN terminal and the backbone LAN which is on the other side of the AP, which could not be done in the temporary session.

In the communications sequence shown in FIG. 13, the wireless LAN terminal 3 first made a connection with the AP 2. However, even if the first connection is made to the AP 1 or to another AP, the operations that were performed by the AP 2 as explained above are performed by the other AP that is chosen instead of the AP 2, and the processing in the communications sequence remains the same. In other words, in the example mentioned above, the wireless LAN terminal 3 first receives the information for connecting to the AP 1 from the server 4 via the AP 2. However, instead of receiving the information from the server by connecting first to the AP 2, there are instances where the wireless LAN terminal 3 receives the information for connecting to the AP 1 from the server 4 via the AP 1 from the beginning. In this case, the temporary connection and the regular connection are made only with the AP 1.

The communications case shown in FIG. 13 are described with a focus on the operations of the wireless LAN terminal 3, without showing the communications sequence that takes place inside the server 4, which is the processing from where the server 4 receives the user's account name and password from the wireless LAN terminal 3 up to where the server 4 returns the encipher key and the channel. However, this processing is performed in processing which is discussed below with reference to FIGS. 24 and 25. Therefore, explanations are omitted here.

Figure 14:
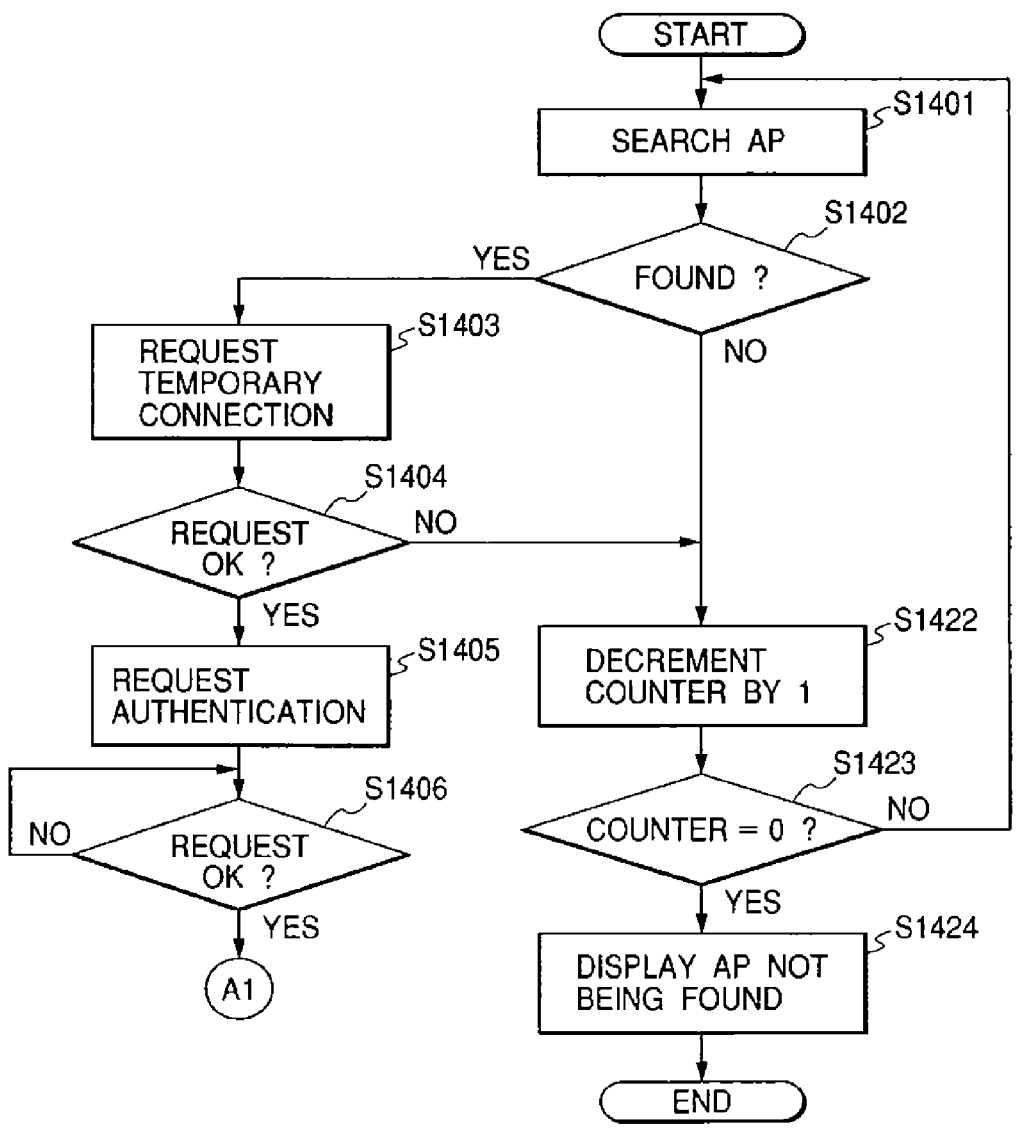
FIG. 14 is a flowchart showing a processing sequence for connecting to the AP, which is performed by the wireless LAN terminal.
Figure 15:
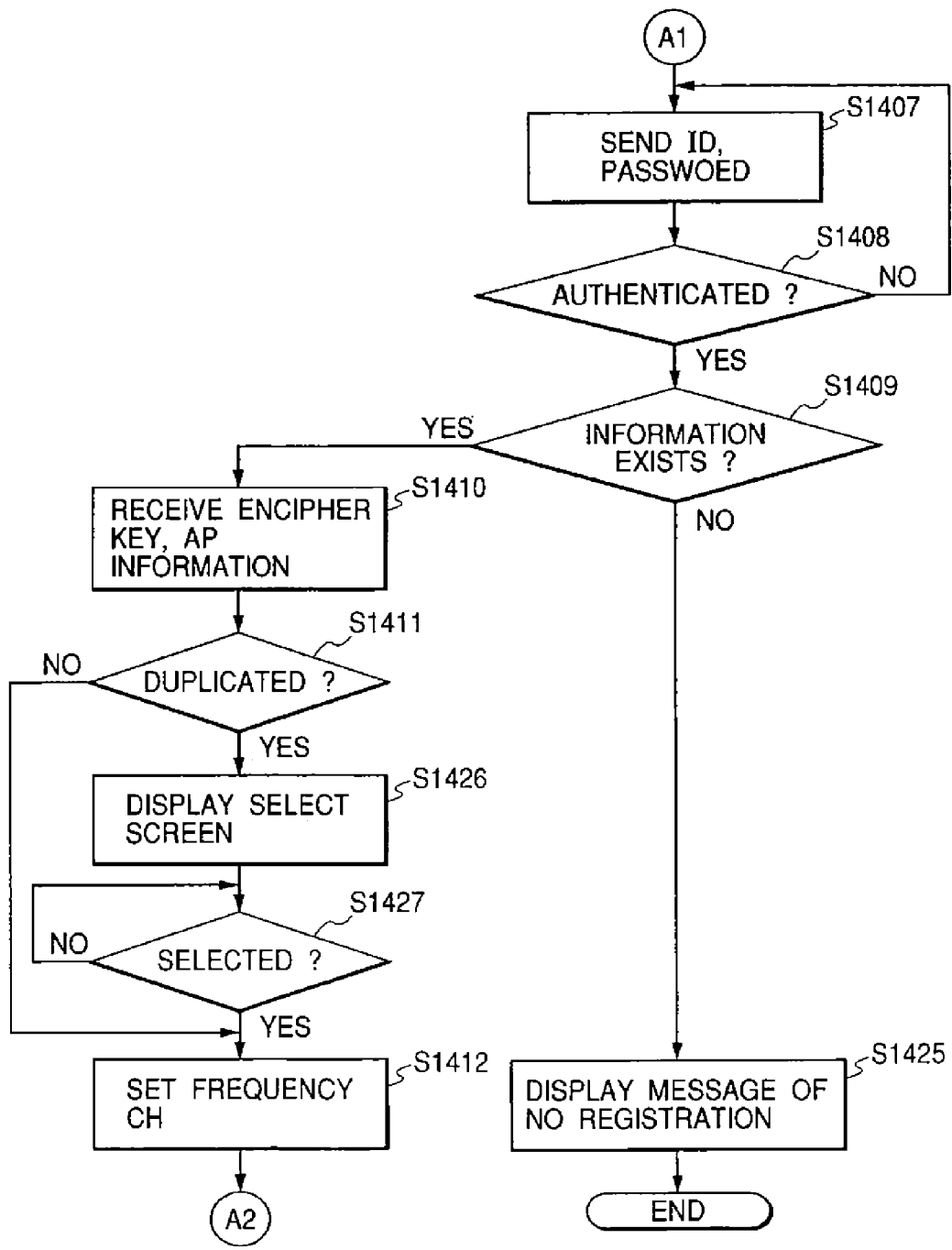
FIG. 15 is a flowchart showing another processing sequence for connecting to the AP, which is performed by the wireless LAN terminal.
Figure 16:
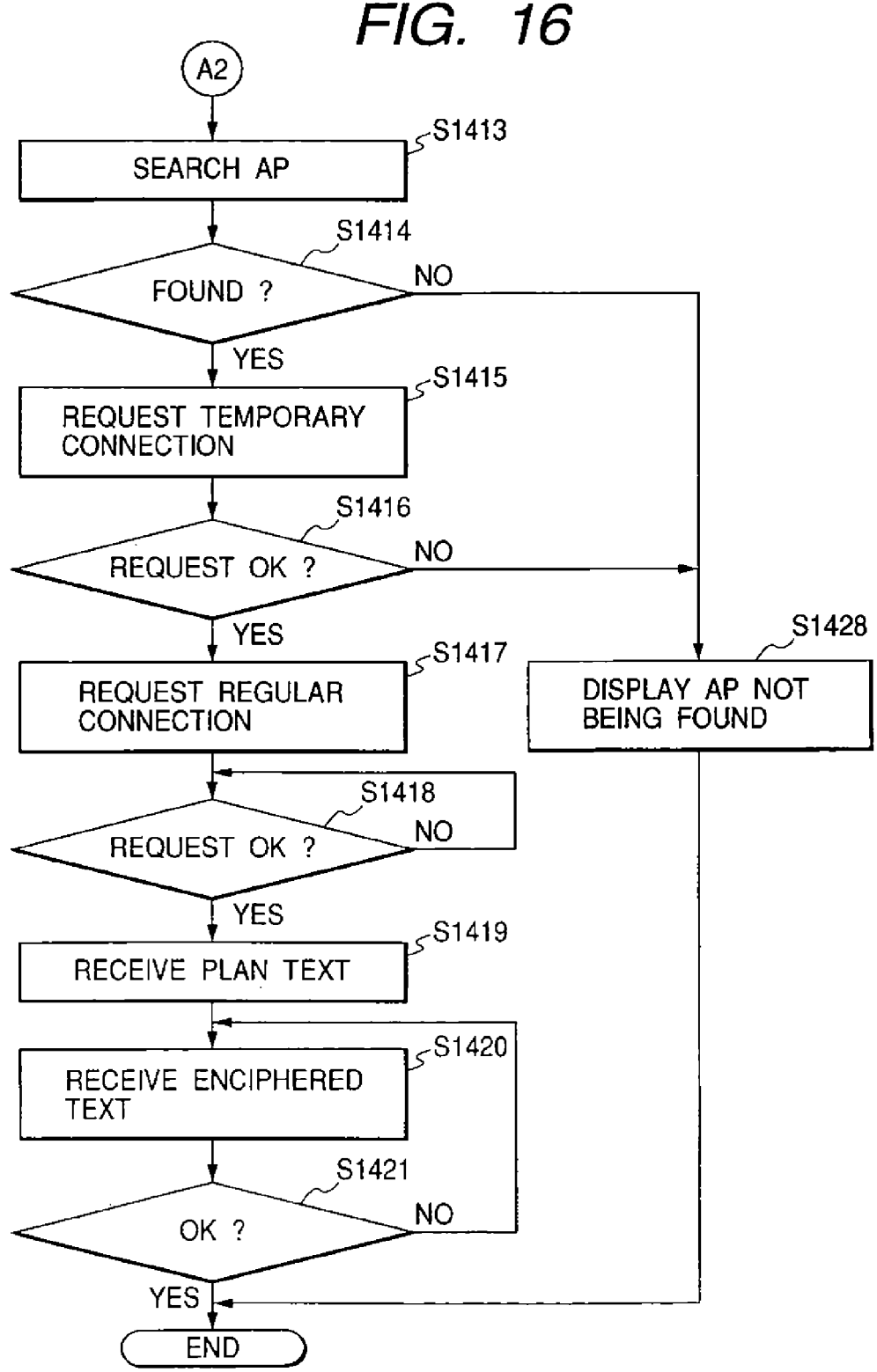
FIG. 16 is a flowchart showing yet another processing sequence for connecting to the AP, which is performed by the wireless LAN terminal.

FIGS. 14 to 16 are flowcharts showing processing sequences to connect to the AP performed by the wireless LAN terminal. This connection processing is started immediately after the meeting attendee turns ON the power source to his or her wireless LAN terminal and loads the conferencing application.

First, in the initial settings of the conferencing application, one counter is set for the RAM in the wireless LAN terminal, and its counter value is set to 14.

At step S1401, the wireless LAN terminal selects a channel corresponding to the counter value of the above-mentioned counter, from among the frequency channels used by the wireless ranging from channel 1 to channel 14. The wireless LAN terminal then tries to receive the radio waves in the frequency band of that channel and searches for radio waves from the AP. At step S1402, it is determined whether or not the radio waves from the AP in that frequency band are found. If they are found, then the procedure advances to step S1403, if not, then step S1422. At step S1422, the counter value in the counter decrements by 1, then at step S1423 it is determined whether or not the counter value after the reduction is now 0. If it is 0, then the procedure advances to step S1424. On the other hand, if it is not 0, then the procedure returns to step S1401, and the next channel is selected as determined by the counter value that was selected at step S1422. At step S1424, since the radio waves from the AP could not be received at any of the frequency channels from channel 1 to channel 14, the wireless LAN terminal performs a display on the screen of wireless LAN's display device, saying, "Wireless LAN access point not found. Cannot connect to conferencing access point. Possibly out of range to receive radio waves from access point." The wireless LAN terminal then ends this connection processing.

At step S1402, if it is determined that the radio waves from the AP are found, then the procedure advances to step S1403 and a temporary connection request is sent to the AP outputting the radio waves (this is AP 2 in the example shown in FIG. 13, and the following explanations are given regarding AP 2). At step S1404, it is determined whether or not the temporary connection request was received. If it was received, then the procedure advances to step S1405. If not, then step S1422.

At step S1405, the wireless LAN terminal sends an authentication request to the AP 2 in order to receive authentication from the server. At step S1406, the procedure waits until a response comes from the AP 2 indicating that the authentication request was received. When the response comes, the procedure advances to step S1407.

At step S1407, the wireless LAN terminal sends the account name (ID) and password inputted by the user of the wireless LAN terminal to the AP 2. At step S1408, it is determined whether or not the account name and password sent to the AP 2 were authenticated in the sever. If the account name and password are the same as those registered in the server and they are authenticated, then the procedure advances to step S1409. On the other hand, if not authenticated, then the procedure returns to step S1407, and after the user of the wireless LAN terminal re-enters the account name and password, the wireless LAN terminal sends them to the AP 2.

At step S1409, it is determined whether meeting reservation information for a meeting being held at the time when the wireless LAN terminal accessed the server or a meeting to be held after that time has been registered in the server. If such information is registered, then the procedure advances to step S1410. If not, then step S1425. At step S1425, since there is not scheduled meeting for the user of the wireless LAN terminal to attend, a display is displayed on the display screen of the wireless LAN terminal, saying, "No meetings registered.", and this connection processing ends.

At step S1410, the wireless LAN terminal receives the meeting reservation information (encipher key, channel to be used, etc.) for the meeting(s) which the wireless LAN terminal user should attend, as registered in the server. At step S1411, based on the received meeting reservation information, it is determined whether or not multiple meetings are scheduled at the time closest to the time when the wireless LAN terminal accessed the server. If there are overlapping meetings, then the procedure advances to step S1426. If not, then step S1412.

At step S1426, the overlapping sets of meeting information are displayed on the screen of the display device of the wireless LAN terminal, and the user of the wireless LAN terminal must choose which meeting to attend. At step S1427, the processing waits for a meeting to be selected. When selected, the procedure advances to step S1412.

At step S1412, based on the channel that is included in the received meeting information, the wireless LAN terminal sets the frequency channel to be used with the wireless LAN at the given meeting.

At step S1413, the wireless LAN terminal tries to receive the radio waves in the frequency band of the frequency channel that was set at step S1412, and searches for the radio waves from the AP. At step S1414, based on the results of the search, it is determined whether or not the radio waves from the AP have been found. If they have been found, then the procedure advances to step S1415. If not, then step S1428. At step S1428, a display is performed on the screen of the display device of the wireless LAN terminal saying, for example, "Cannot find access point for the meeting. Access point may not be operating properly, or terminal may not be within area to receive radio waves from access point. Your meeting to attend is Regular Meeting, taking place on 2002/4/19 from 9 am until 12 noon, in Meeting Room 1. Please reconfirm location." Then, the current connection processing ends.

At step S1414, in the case where it is determined that the radio waves from the AP have been found, the procedure advances to step S1415, and the temporary connection request is sent to the AP that outputted the radio waves. (This is the AP 1 in the examples shown in FIG. 13, and the following explanations are given regarding AP 1.) At step S1416, it is determined whether or not the temporary connection request was accepted. If it was accepted, then the procedure advances to step S1417. If not, then step S1428. Note that, the AP 1 may be found but the temporary connection request may not be accepted. This could occur because the AP 1 is busy with access from another terminal and could not respond thus causing the wireless LAN terminal to time out, or because the AP 1 does not have a function to respond to the temporary connection request thus causing the wireless LAN terminal to time out.

At step S1417, the wireless LAN terminal sends the regular connection request to the AP 1. At step S1418, the processing waits for the AP 1 to accept the regular connection request, and then the processing advances to step S1419.

At step S1419, the wireless LAN terminal receives the plain text which is the predetermined text sent from the AP 1. At step S1420, the wireless LAN terminal uses the encipher key, which was included in the meeting reservation information received from the server, to encode the plain text that was received, and then sends the enciphered text to the AP 1. The AP 1 then uses the same encipher key to return the enciphered text to plain text, and compares this against the plain text which the AP 1 previously sent to the wireless LAN terminal. At step S1421, based on the results of the comparison, it is determined whether or not both of the plain texts are the same. If they were both the same, then the regular session is established between the wireless LAN terminal and the AP 1, and the regular connection processing ends. However, if the results of the comparison indicate that they are not the same, then the processing returns to step S1420 and the enciphered text is sent once again. The plain texts may be different from each other because of damage caused to the transmitted data or other problems unpredictably causing the data to change, or due to other reasons.

As described above, in accordance with Embodiment 1, the meeting attendee simply enters the room and inputs the account ID (which is his or her own ID) and password into the wireless LAN terminal which he or she brought. There is no need to set the channel that will be used or the encipher key into the wireless LAN terminal. The channel and encipher key are then sent from the AP 1 installed in the meeting room 1, and wireless communications can be established between the wireless LAN terminal and the AP 1.

Embodiment 2

Next, explanation is given regarding Embodiment 2.

In Embodiment 1, the AP was provided (fixed) in the meeting room. Therefore, as understood from the AP information in FIG. 11, the meeting room name and the IP address assigned to the AP correspond one-to-one. As such, the server can specify the meeting room where the given AP is installed based on the IP address of the AP that accessed the server. Therefore, at step S1203 in the notification processing for notifying the meeting room reservation information, the server can extract the meeting room name and channel corresponding to the IP address of the AP 1 that sent the Ready signal, from the AP information exemplified in FIG. 11, and can send this to the AP 1.

However, another instance is conceivable in which the APs are not installed into each meeting room, and the meeting organizer brings the AP into the meeting room each time the AP will be used in the meeting. In this case, the AP and the meeting room do not correspond one-to-one. Even if the server examines the IP address of the AP that accessed the server, the server cannot judge which meeting information to send to that AP. Embodiment 2 is arranged to resolve this type of problem.

Figure 17:
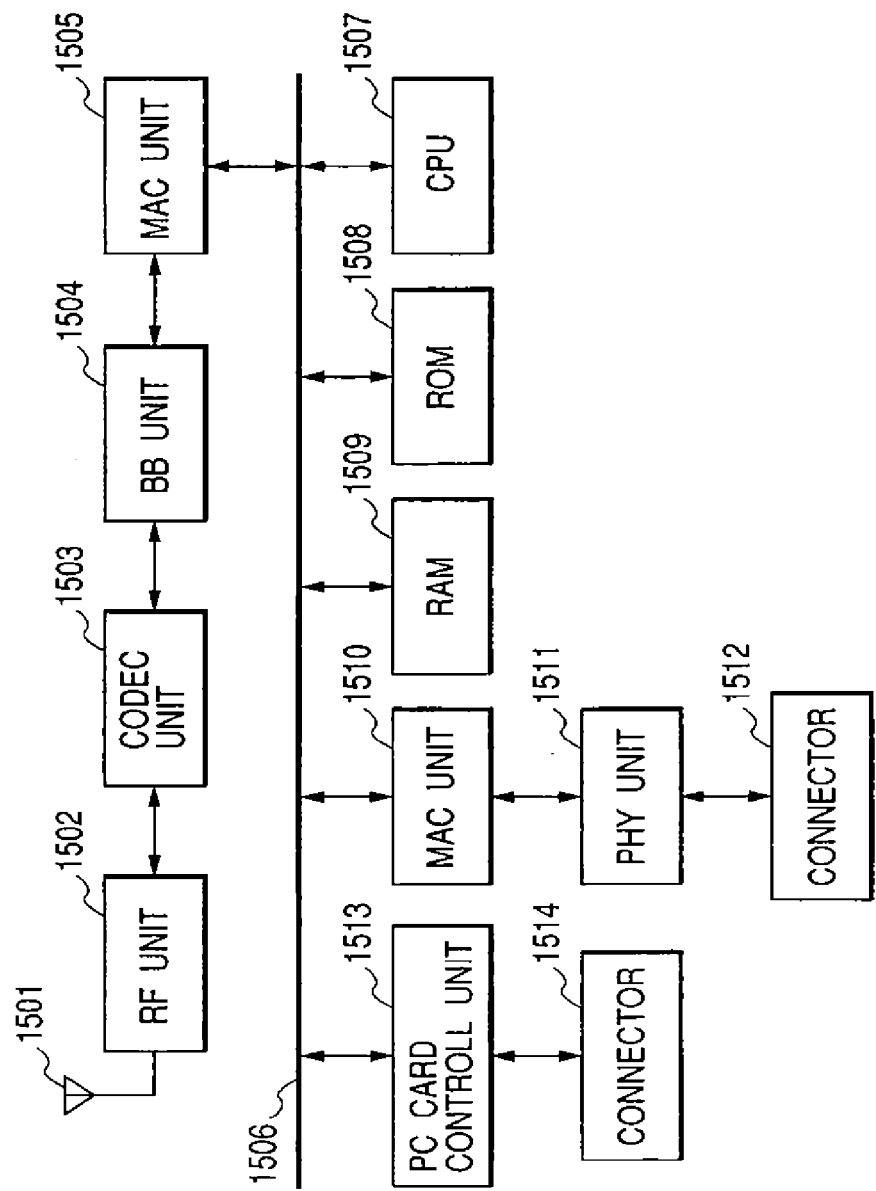
FIG. 17 is a block diagram showing a configuration of the access point (AP) in accordance with Embodiment 2.

FIG. 17 is a block diagram showing a configuration of the access point (AP) in accordance with Embodiment 2.

In FIG. 17, reference numeral 1501 refers to an antenna unit of the wireless LAN. Reference numeral 1502 refers to an RF (Radio Frequency) unit connected to the antenna unit 1501 for sending and receiving the radio waves. Reference numeral 1503 refers to a codec unit for modulating the radio waves received and demodulating radio waves to be sent. Reference numeral 1504 refers to a BB (Base Band) unit for forming signals to be sent and received. Reference numeral 1505 refers to a MAC (Medium Access Controller) unit for use with the wireless LAN. Reference numeral 1506 refers to an internal bus. Reference numeral 1507 refers to a CPU (Central Processing Unit) for controlling the AP in accordance with a control program. Reference numeral 1508 refers to a ROM (Read Only Memory) storing the control program. Reference numeral 1509 refers to a RAM (Random Access Memory) for use as a work area for the CPU 1507 and for storing the meeting information received from the server, and the like. Reference numeral 1510 refers to a MAC unit for Ethernet (trademark). Reference numeral 1511 refers to a PHY (Physical) controller portion for use with the Ethernet. Reference numeral 1512 refers to an Ethernet interface connector. Reference numeral 1513 refers to a PC card control unit. Reference numeral 1514 refers to a PC card connector.

Figures 18, 19:
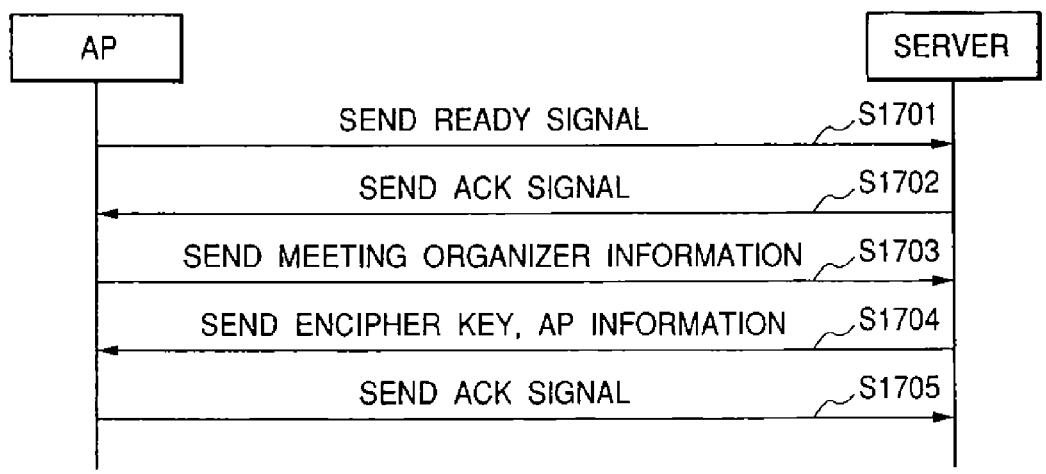
FIG. 18 shows an example of personal information of the meeting organizer, which is stored in a nonvolatile memory in a PC card inserted into a PC card connector shown in FIG. 17.
FIG. 19 is a sequence diagram of communications processing by which the AP receives from the server an encipher key, a channel, and other meeting information to be used with the AP configured as in FIG. 17.

FIG. 18 is a diagram showing an example of personal information of the meeting organizer stored in a nonvolatile memory in a PC card inserted into the PC card connector 1514 shown in FIG. 17.

As shown in the diagram, the organization name, user name, account name, and password of the meeting organizer are recorded in the nonvolatile memory.

FIG. 19 is a sequence diagram of communications processing by which the AP receives, from the server, the encipher key, the wireless channel and other meeting information to be used with the AP which is configured as shown in FIG. 17.

As in Embodiment 1, where the AP is installed in the meeting room as shown in FIG. 12, when a portable AP is used in a specific meeting room, the communications processing of FIG. 19 is used to send the encipher key and wireless channel and other meeting information to be used with that AP from the sever to the AP.

Here, it is assumed that the AP 1 constructed as shown in FIG. 17 is taken into the meeting room 1 and used for a meeting to be held in the meeting room 1. A PC card storing the information about the meeting organizer is inserted into the PC card connector 1514 of the AP 1. A wire cable is connected from the backbone LAN to the Ethernet interface connector 1512, and the power source to the AP 1 is turned on. This starts the communications processing shown in FIG. 19.

At step S1701, the AP 1 designates the server's IP address and sends the Ready signal to notify the server that the power source for the AP 1 has been turned on and the AP 1 can be operated. At step S1702, the server sends to the AP 1 the Ack signal, which is the response signal indicating that the server has received the Ready signal.

At step S1703, the AP 1 reads the meeting organizer information (exemplified in FIG. 18) stored in the PC card inserted into the PC card connector 1514, and sends this information to the server.

At step S1704, having received the information about the meeting organizer, the server compares the account name and password of the meeting organizer against the same database information as in Embodiment 1 (exemplified in FIG. 10). Then, from among all the meeting information set for the user with that account name and password, the server sends to the AP 1 the meeting information (i.e., the channel to be used with the AP, the encipher key to be used for that meeting, etc.) for the meeting that will be held the soonest. Note, if a meeting is being held during the time when the comparison is made, then the meeting information for that meeting is sent.

At step S1705, if the AP 1 has correctly received the meeting information from the server, then the AP 1 sends the Ack signal to the server. The AP 1 sets the wireless channel to the channel contained in the meeting information received.

As described above, in the case where the AP is carried into the meeting room, the server can determine the channel to be used with the AP and the encipher key to be used for that meeting, based on the information about the meeting organizer in the PC card, and the same database information as the database information that is used in Embodiment 1, which is exemplified in FIG. 10. Therefore, even in the case where the meeting organizer carries the AP into the meeting room to use it, the server can send to the AP the meeting information for that meeting.

Except for the operations of the communications sequence shown in FIG. 19, the operations of the conferencing system in Embodiment 2 are the same as those in Embodiment 1 using the AP that is installed in the meeting room. Explanations of those similar operations are omitted here.

Embodiment 3

Next, explanation is given regarding Embodiment 3.

In some instances, only 1 AP is present in the meeting room. In such a case, according to Embodiment 1, as exemplified in FIG. 10, the server assigned the wireless channel and the encipher key to be used in a meeting held in that meeting room into the database of each meeting attendee. However, there are also instances where multiple APs are installed in a single room, as is true for meeting rooms A, B, and C shown in FIG. 11. In such a case, the server cannot simply assign the wireless channel and encipher key.

In Embodiment 3, the wireless LAN terminals of the meeting attendees are assigned automatically and evenly to the multiple APs installed in the same meeting room. That is, the wireless channels and encipher keys are determined such that the meeting organizer comes to the meeting room, and immediately after the wireless LAN terminal's conferencing application is booted, the number of wireless LAN terminals that will be connected to each of the multiple APs becomes even.

The meeting organizer then sends to the server the data for the reservation status screen as exemplified in FIG. 20. In FIG. 20, the reservation date is 2002/4/19, the desired meeting room is a meeting room A where 2 APs are arranged, the meeting start time is 9 am, the meeting end time is 12 noon, and the meeting name is Regular Meeting.

FIG. 21 is a diagram showing an example of a screen of a meeting room reservation request response, which is sent back to the terminal of the meeting organizer from the server that received the reservation status screen data as exemplified in FIG. 20.

In FIG. 21, the rectangular graphs are charted into the time frame from 9 am to 12 noon for the meeting room A, thus indicating the reservation.

FIG. 22 is a diagram showing an example of database information of Embodiment 3, which corresponds to the database information of Embodiment 1 exemplified in FIG. 10.

In FIG. 22, a reservation is made for a Regular Meeting in the meeting room A during a time frame from 9 am to 12 noon. However, the encipher key and the wireless channel to be used for the meeting are yet undecided, and those fields are left blank.

Figure 23:
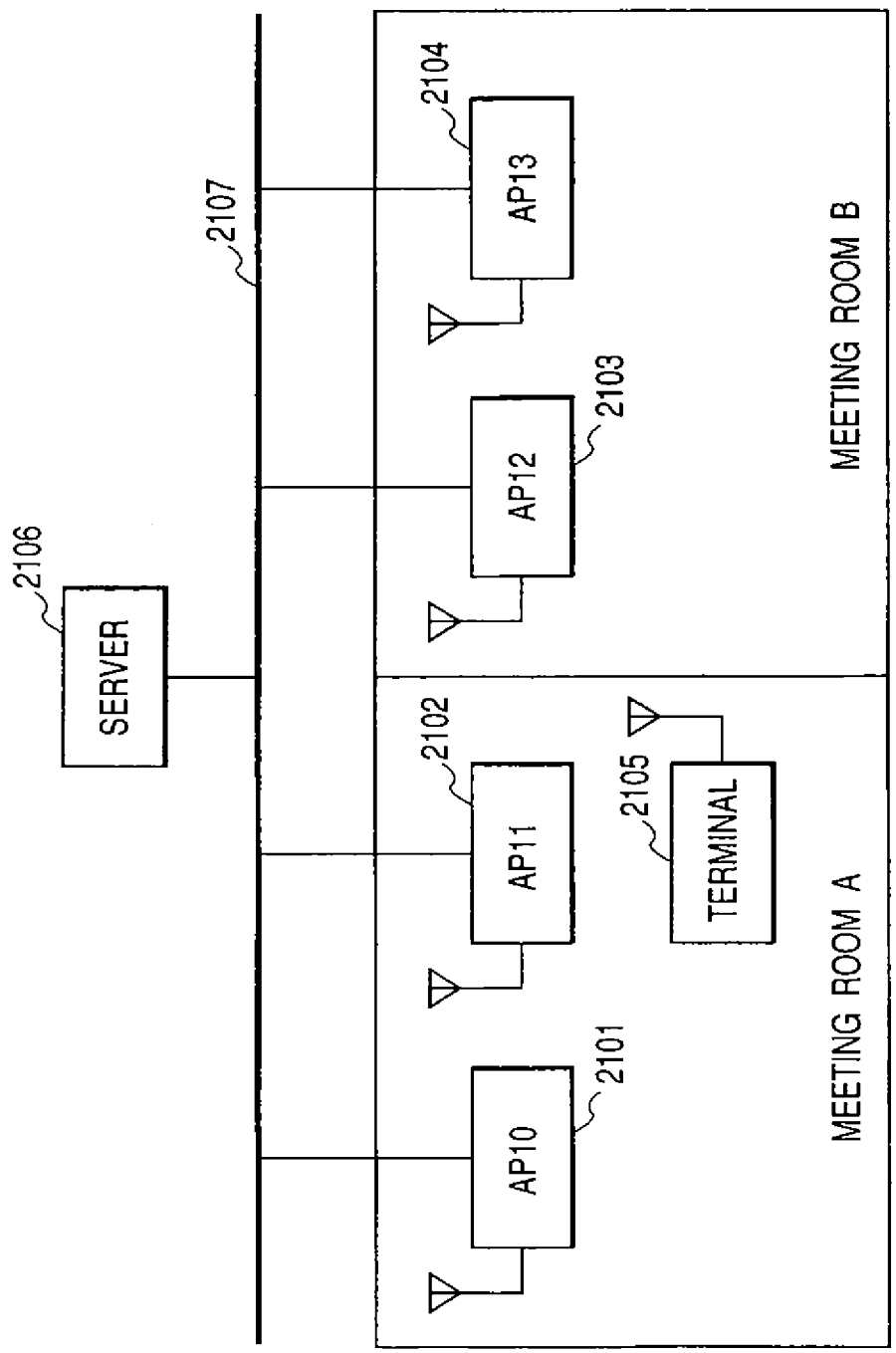
FIG. 23 is a block diagram showing a configuration of a conferencing system in accordance with Embodiment 3.

FIG. 23 is a block diagram showing a configuration of a conferencing system in accordance with Embodiment 3.

In FIG. 23, reference numerals 2101, 2102, 2103, and 2104 indicate wireless LAN access points AP (10) through AP (13). AP (10) 2101 and AP (11) 2102 are arranged in the meeting room A, and AP (12) 2103 and AP (13) 2104 are arranged in a meeting room B. The meeting room A and meeting room B are neighboring each other. It is assumed here that the radio waves emitted from AP (12) 2103 and AP (13) 2104 can be received in the meeting room A.

Reference numeral 2105 refers to a wireless LAN terminal capable of performing wireless communications with the AP (10) 2101 through AP (13) 2104. Reference numeral 2106 indicates a server having the authentication function and the database function. Reference numeral 2107 refers to the backbone LAN connecting the AP (10) 2101 through AP (13) 2104 with the server 2106.

The following explanations are given based on an example in which the meeting attendees enter the meeting room A with their wireless LAN terminals 2105 at the time when the meeting is going to start. The wireless LAN terminal then connects with the AP (12) 2103 first, and then after the authentication is performed with the server 2106 connects with the AP (10) 2101. The connection processing sequence of Embodiment 1 shown in FIG. 13 is also used in the following explanations.

In FIG. 13, the processing from step S1301 to step S1305 is entirely the same as that in Embodiment 1, except in that the AP 2 is changed to AP (12) 2103.

Figure 24:
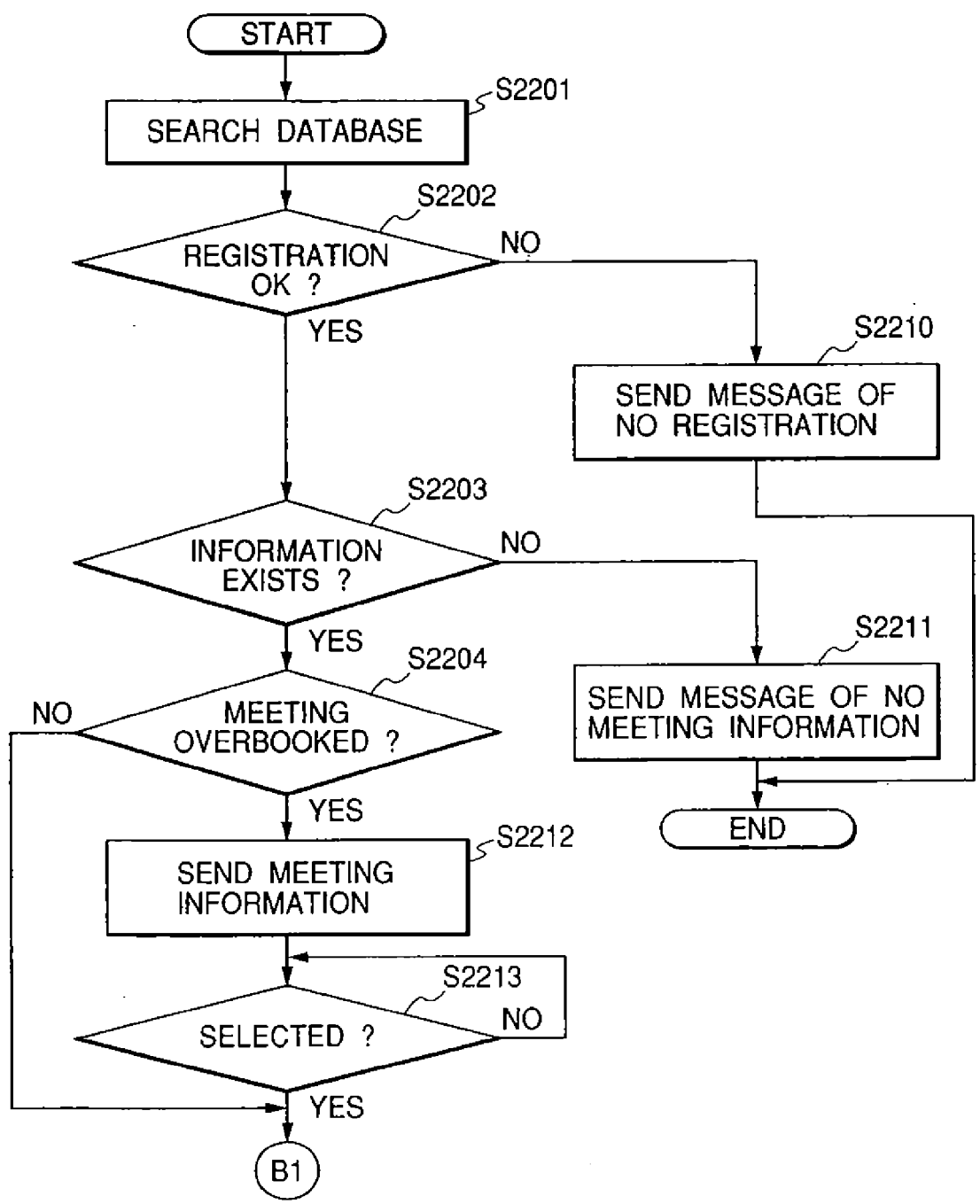
FIG. 24 is a flowchart showing a sequence of authentication and processing to send meeting information, which are executed by the server in accordance with Embodiment 3.
Figure 25:
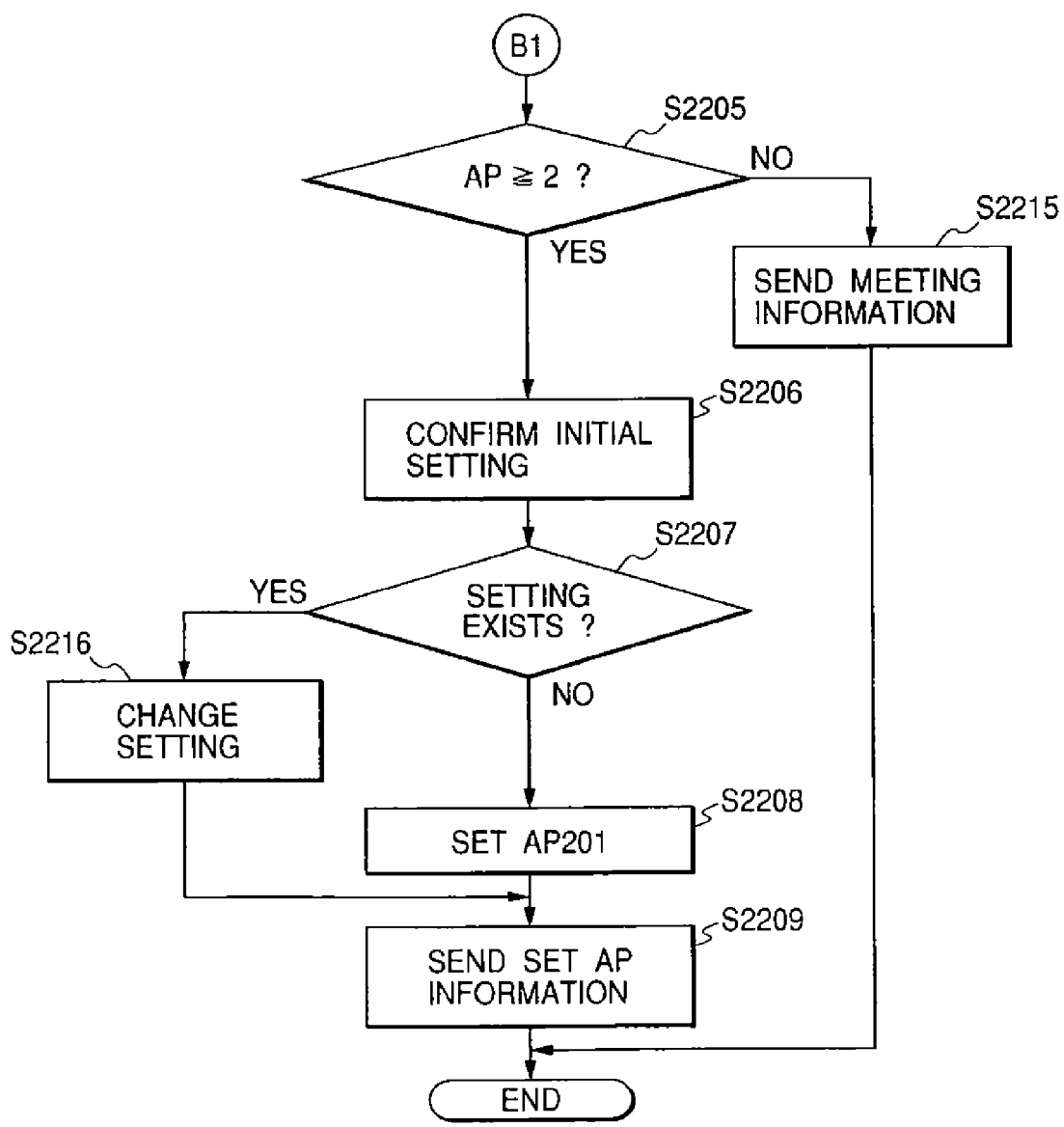
FIG. 25 is another flowchart showing a sequence of authentication and processing to send meeting information, which are executed by the server in accordance with Embodiment 3.

After that, at step S1306, the AP (12) 2103 sends the user account name and the password of the wireless LAN terminal 2105 to the server 2106. At this time there are two APs in the meeting room A. Therefore, the server 2106 must connect the authenticated wireless terminal 2105 to one of the APs. FIG. 24 and FIG. 25 are used to explain the operations of the server 2106 at this time.

FIG. 24 and FIG. 25 are flowcharts showing a sequence of authentication and processing to send the meeting information, which are executed by the server 2106, in accordance with Embodiment 3.

At step S2201, the server 2106 performs a search to determine whether or not the account name (ID) and the password of the wireless LAN terminal 2105 which the server 2106 received are registered in database information of Embodiment 3, which is identical to the database information of Embodiment 1 exemplified in FIG. 8. Then, at step S2202, depending on the results of the search, the procedure either advances to step S2203 if the registration is found, or to step S2210 if the registration is not found. At step S2210, the server 2106 sends a message via the AP (12) 2103 to the wireless LAN terminal 2105 saying, "Either not registered in database or input is incorrect", and then the current processing ends.

At step S2203, the server 2106 confirms whether or not the meeting settings for the user of the wireless LAN terminal 2105 have been made in the database information of Embodiment 3, which is identical to the database information of Embodiment 1 exemplified in FIG. 10. If confirmed to be so, then the processing advances to step S2204. If not, advances to step S2211. At step S2211, the server 2106 sends a message via the AP (12) 2103 to the wireless LAN terminal 2105 saying, "No meeting registered", and then the current processing ends.

At step S2204, the server 2106 determines whether or not multiple meetings are booked at the same meeting start time for the user of the wireless LAN terminal 2105 in the above-mentioned database information of Embodiment 3. If confirmed to be so, then the processing advances to step S2212. If not, advances to step S2205.

At step S2212, the server 2106 sends the wireless LAN terminal 2105 the meeting names, the meeting room names, the start times, the end times, and the like for all the meetings starting at the same time which are registered in the above-mentioned database information of Embodiment 3. At step S2213, the processing then waits for the user of the wireless LAN terminal 2105 that received this information to select 1 meeting which he or she will attend. Then the processing advances to step S2205.

At step S2205, the server 2106 references the AP information of Embodiment 3, which is identical to the AP information of Embodiment 1 exemplified in FIG. 11, and confirms whether or not two or more APs are installed in the meeting room where the meeting will be held. If confirmed to be so, the procedure advances to step S2206. If not, advances to step S2215.

If the AP is carried into the meeting room to be used there, as explained in Embodiment 2, then the AP sends the information about the meeting organizer to the server at the time when the AP is booted up by the meeting organizer. In Embodiment 3, the server then creates a database inside itself at that time and determines which APs are placed in which meeting room (this is the same as the AP information of Embodiment 1 exemplified in FIG. 11), and then determines how many APs are in which room.

At step S2215, the server 2106 sends the meeting information (the channel, encipher key, etc. to be used at the meeting) via the AP (12) 2103 to the wireless LAN terminal 2105, and then the current processing ends.

As shown in FIG. 22, in a case where the meeting will be held in a meeting room arranged with 2 or more APs, the channel and the encipher key to be used which must be set into the wireless LAN terminals of the meeting attendees cannot be set at the point in time when the meeting reservation is made. In Embodiment 3, one register with the AP name is created inside the server 2106. Nothing is written in this register when none of the meeting attendees' wireless LAN terminals have yet accessed the server 2106.

At step S2206, the server 2106 confirms whether any content has been written into the above-mentioned register. At step S2207, depending on the results confirmed in the previous step, if settings (written content) of any sort exists in the register then the processing advances to step S2216. If not, advances to step S2208. Here, nothing is set (written) in the register in a case where the server 2106 is accessed for the first time by the users attending the meeting held in the meeting room A and the processing is carried out. Therefore, the procedure advances to step S2208. However, if another wireless LAN terminal has accessed the server 2106 before the wireless LAN terminal 2105 currently accessing the server 2106, then the procedure advances to step S2216.

At step S2208, the name of the AP assigned with the smallest number of all the APs placed in the meeting room is written into the register. In this embodiment, the AP 10 and the AP 11 are placed in the meeting room A, so the AP 10 is set into the register.

At step S2216, the AP name that has not been written into the register is written into the register, and then the procedure advances to step S2209. In this embodiment, the 2 APs (AP 10 and AP 11) are placed in the meeting room A. Therefore, for example, if the AP 10 has been written in the register, this is rewritten to the AP 11. If 3 or more APs are placed in the meeting room, starting with the AP with the smallest number, for example, the AP names are written into the register and then when the greatest number is reached, the AP name with the smallest number is written into the register once again.

At step S2209, the AP name that is set in the register is read out, and the AP information of Embodiment 3, which is the same as the AP information of Embodiment 1 exemplified in FIG. 11 is referenced, and the wireless LAN channel corresponding to the AP name that was read out is then read out. Further, the encipher key that was sent to the AP in the step in Embodiment 3 which is the same as step S1203 in Embodiment 1 shown in FIG. 12 is then sent to the wireless LAN terminal 2105 together with the wireless LAN channel that was just read out.

As described above, in Embodiment 3 the server changes the AP name in the register each time the wireless LAN terminal accesses the server. The channel corresponding to the AP name in the register is then notified to the wireless LAN terminal. Therefore, the wireless LAN terminal that has accessed the server is connected to different APs, one after the other, in the order of access to the server. As a result, the wireless LAN terminals get evenly distributed across the APs.

In the above-mentioned embodiments, the explanations were given regarding a conferencing system for connecting specific wireless LAN terminals to specific APs. However, the present invention is not restricted to such a configuration, and may also be applied in another PAN where the wireless LAN is used. In such a case, there do not have to be divisions between rooms such as in meeting rooms. The system may be a wireless LAN system in an open space such as an airport, a hotel lobby, or the like. Furthermore, in such case, each group (section) does not have to have a meeting organizer as in the conferencing system. Instead, the settings may be performed by a administrator or other manager managing the entire system.

According to the detailed descriptions given above, when connecting the wireless LAN terminal to the specific wireless communication access point, the wireless channel, the encipher key, and the other connection information which are necessary to make the connection are not set manually into the wireless LAN terminals. Rather, the above-mentioned connection information which is on the server that has connected to the wireless communication access point is automatically received, whereby the wireless communications is established between the wireless LAN terminal and the specific wireless communication access point.

Furthermore, since the multiple wireless communication terminals can be connected evenly across multiple wireless communication access points placed in the same location, the wireless LAN terminals are not assigned concentratedly on a specific wireless communication access point, and it thus becomes possible to avoid communications traffic concentrating on a specific wireless communication access point.

Embodiment 4

Below, detailed explanation is given regarding Embodiment 4 of the present invention, with reference made to the diagrams.

Figure 26:
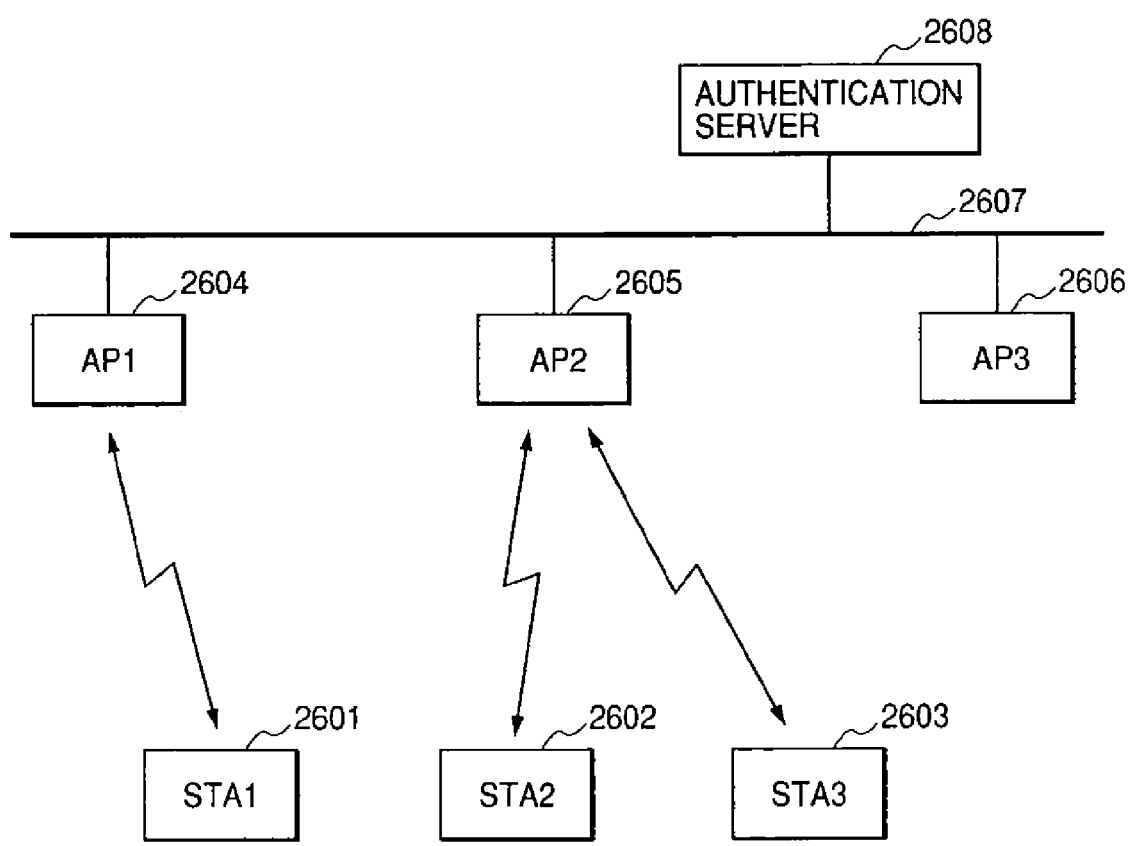
FIG. 26 is a block diagram showing an overall structure of a network system in accordance with Embodiment 4 of the present invention.

FIG. 26 is a block diagram showing an overall structure of a network system in accordance with this embodiment.

In the network system of this embodiment shown in FIG. 26, a wired LAN (Local Area Network) and a wireless LAN are connected to each other via an information device which is the access point. A plurality of wireless communication terminals 2601 (STA1), 2602 (STA2), and 2603 (STA3) which constitute the wireless LAN are connected to the wired LAN 2607. There are also provided wireless communication terminals 2601-2603, along with a plurality of access points 2604 (AP1), 2605 (AP2), and 2606 (AP3) which are capable of performing wireless communications, and an authentication server 2608 connected to the wired LAN 2607.

The wireless communication terminals 2601-2603 are each constituted by a portable personal computer or PDA (Personal Data Assistant) having wireless communication functions, and these wireless communication terminals 2601-2603 connect to one of the access points 2604-2606 to perform wireless communications. The wireless communications performed between the wireless communication terminals 2601-2603 are all performed via one of any of the access points 2604-2606. In FIG. 26, the wireless communication terminal 2601 is connected to the access point 2604. The wireless communication terminals 2602 and 2603 are shown both being connected to the access point 2605.

When each user using the wireless communication terminals 2601-2603 accesses the wired LAN 2607 via the access points 2604-2606, the authentication server 2608 performs authentication to confirm whether or not to permit the user's access. In this embodiment, the authentication server 2608 may operate as a RADIUS server, for example, which performs the authentication based on RADIUS (Remote Authentication Dial In User Service) protocol.

In the network system of this embodiment, on the wired LAN 2607, there may also be multiple devices in addition to the authentication server 2608 (e.g., personal computers, printers and other peripheral devices, copying machines, etc.). Furthermore, the wireless communication terminals 2601-2603 and the access points 2604-2606 are not limited to the number shown in the diagrams. Many may be arranged in the system.

Figure 27:
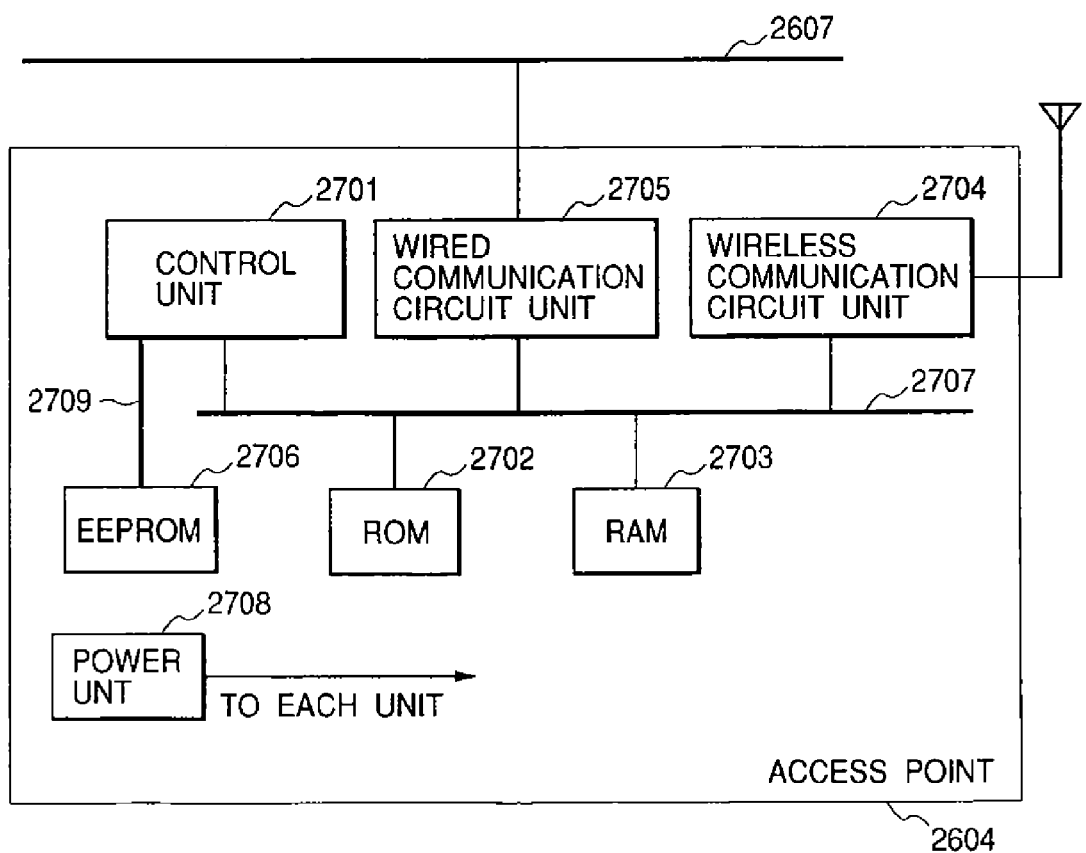
FIG. 27 is a block diagram showing an internal structure of the access points shown in FIG. 26.

FIG. 27 is a block diagram showing an internal structure of the access points shown in FIG. 26.

In FIG. 27, similarly to the other access points 2605 and 2606, the access point 2604 is constructed with a control unit 2701, a ROM 2702, a RAM 2703, a wireless communication circuit unit 2704, a wired communication circuit unit 2705, an EEPROM 2706, a system bus 2707, and a power unit 2708. Other than the EEPROM 2706, each of the units are connected to each other by means of the system bus 2707.

The EEPROM 2706 is connected directly to the control unit 2701 via the serial interface 2709. The power unit 2708 provides electrical power necessary for operations to each of the above-mentioned units.

The control unit 2701 is a portion for performing overall control of the access point 2604 and is constituted of a microprocessor and its peripheral circuitry, etc. The control unit 2701 operates by means of an operation control program stored in the ROM 2702, and processes frames (signals) which are sent and received among the wireless communication terminals 2601-2603 and devices which are not shown in the diagram but are present on the wired LAN 2607, distributing the frames so as to make sure they arrive at their proper destinations. Furthermore, the control unit 2701 executes processing such as access control for each of the units shown in FIG. 27, and also performs various control processings necessary to realize the present invention.

The ROM 2702 is a nonvolatile memory storing an operation control program executed by the control unit 2701. The operation control program stored here is outputted onto the system bus 2707 in response to commands from the control unit 2701.

The RAM 2703 functions as a work memory when the control unit 2701 executes the operation control program, and also functions as a buffer memory for temporarily storing various data sent and received among the wireless LAN terminals 2601-2603 or the devices on the wired LAN 2607.

The wireless communication circuit unit 2704 is constituted of a frequency circuit, an encoder/decoder circuit, an antenna, and the like, and performs transmission and reception of frames among the wireless LAN terminals 2601-2603. The wireless communication method according to this embodiment may be one that is defined by IEEE 802.11, for example. The access points 2604-2606 and the wireless communication terminals 2601-2603 are each assigned unique identification numbers, and these identification numbers are used to designate transmission/reception destinations for the frames.

The wired communication circuit unit 2705 is constituted of a transmission/reception circuit, an encoder/decoder circuit, and the like, and performs transmission and reception of frames among the devices existing on the wired LAN. The wired communication method used in this embodiment may be one that is defined by IEEE 802.3 (so-called "Ethernet (trademark)"), for example.

The EEPROM 2706 is a nonvolatile memory in which data can be rewritten electronically, for storing information about the various settings for determining the operations of the access point 2604, and information about the terminal properties which are notified from each of the wireless communication terminals 2601-2603, and the identification numbers for identifying partner devices in communications, and the like. The control unit 2701 can read and write the above-mentioned information about the various settings and the information about the properties of the terminals and the like through a serial interface 2709.

Furthermore, the EEPROM 2706 can also be used as a memory to store user identification information for identifying the users of the wireless communication terminals 2601-2603 in response with the various connection requests (access requests) sent from the wireless communication terms 2601-2603, and for storing other information pertinent to the access points (e.g., access point names set by the users for each of the access points, and IP addresses, MAC addresses, wireless channels, etc. assigned to the access points.) The user identification information may be the user's email address or name so long as it is possible to specify the user. Or, if a user account has been set up to manage each user's network access rights, then the user identification information may be that user account.

Further, the user identification information can be written and deleted by a user with proper administrative authority making access from an external instrument to the access point either via the wired LAN 2607 or via the multiple wireless LAN terminals that constitute the wireless LAN, or by using input means (not shown in the diagram) provided to the access point itself (e.g., a switch, a touch panel, etc.) to write or erase it in the EEPROM 2706 via the control unit 2701.

Figure 29:
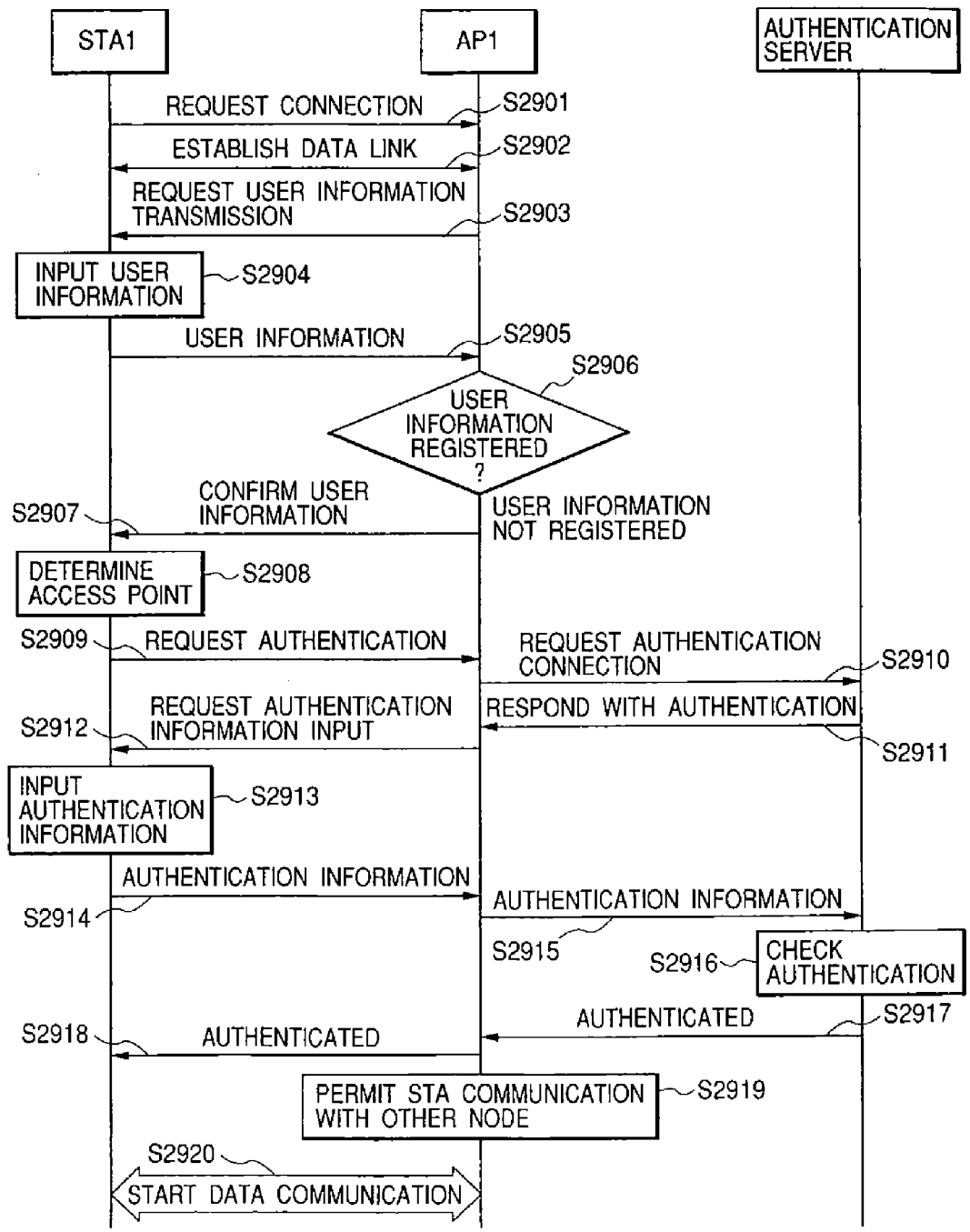
FIG. 29 is an explanatory diagram for explaining a procedure for connecting to the access point in the network system in FIG. 26.

Next, turning to FIG. 28 and FIG. 29, explanation is given regarding processing for designating the access point 2604 as the connection destination for the wireless communication terminal 2601, in a case where the user of the wireless communication terminal 2601, for example, tries to connect to a specific access point in order to attend a meeting, in the network conferencing system using the network system in FIG. 26.

First, before the meeting is started the meeting organizer pre-registers, in the access point 2604 which will be used in the meeting, the information for identifying the user of the wireless communication terminal 2601 (the meeting attendee) and the other information about the meeting. The information for identifying the user and the like is either registered directly by using an operating section (not shown in the diagram) which is provided to the access point 2604, or by registering it through the wireless communication terminals 2601-2603 or through the authentication server 2608 or the like. The registered information is written into the EEPROM 2706 which is in the access point 2604. FIG. 28 shows one example of registered information 2800 which is registered in the EEPROM 2706 in the access point 2604.

As shown in FIG. 28, the registered information 2800 includes information about the meeting such as the access point name, the wireless channel, the day when the meeting will be held, the meeting start time and end time, the account information (account name) of each attendee in order to distinguish among the meeting attendees, etc.

The access point 2604 determines whether or not the user of the wireless communication terminal 2601 that requested the connection is pre-registered as a meeting attendee in the registration information 2800. By including the day when the meeting will be held and the start time, end time, and the like in the registration information 2800, the time frame during which the wireless communication terminal 2601 and the like are connected to the access point 2604 can be restricted just to the time frame when the meeting is held.

FIG. 29 is an explanatory diagram for explaining a procedure for connecting to the access point in the network system in FIG. 26. FIG. 29 shows a sequence performed when the wireless communication terminal 2601 (STA 1) of the user trying to participate in the network conferencing system tries to connect to the access point 2604 (AP1) to participate in the meeting.

In this embodiment, it is assumed that AP 1 is the access point for the meeting which the STA 1 user should connect to. The connection request from the STA 1 is sent to the AP 1 and the data link is established, and after the authentication is performed to gain network access, data transmission/reception is started between the STA 1 and other information devices via the access point. FIG. 29 assumes a case where the access point first discovered by the STA 1 was the access point which the STA 1 should connect to.

Figure 30:
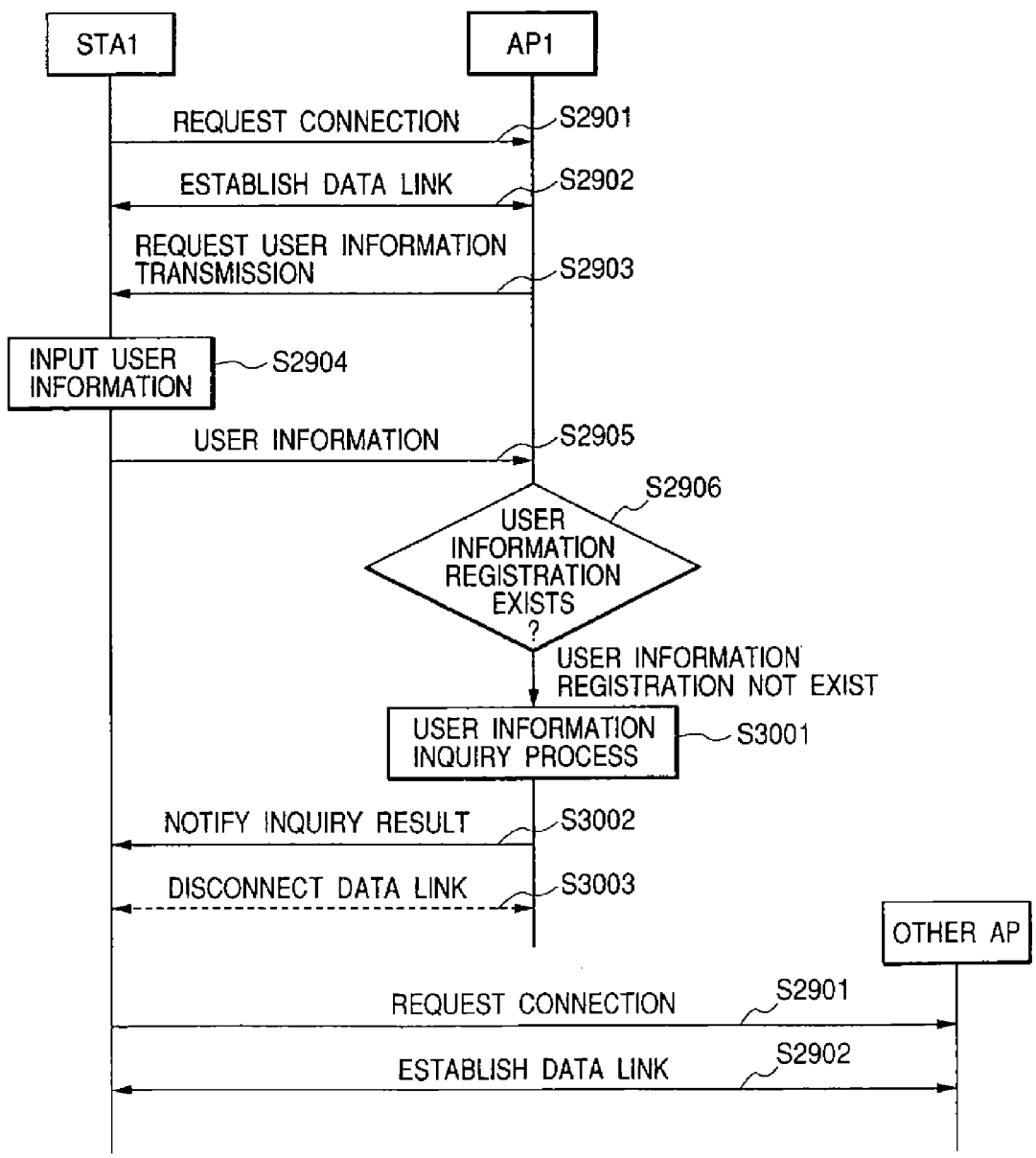
FIG. 30 is another explanatory diagram for explaining a procedure for connecting to the access point in the network system in FIG. 26.

Generally, in a case where multiple access points are present in the vicinity of a wireless communication terminal, the access point which should be connected to is not necessary found at first. FIG. 30 is used for detailed description of processing sequences in a case where the access point which should be connected to cannot be found.

First, a trigger for performing the connection request causes the STA 1 to select one access point from among the access points present in the vicinity, and the connection request is then made to the selected access point (step S2901). Here, the STA 1 is configured so to scan the range of frequencies usable by the wireless LAN and select the first access point it finds and then send the connection request to this access point. Note that the above-mentioned "trigger for performing the connection request" may be the user turning on the power source to the STA 1, or may be the generation of a connection request to the network which occurs upon execution of application software in the STA 1, or other such event.

Next, in response with the connection request from the STA 1, the AP 1 permits the connection request and establishes the data link (step S2902). Typically, wireless communication formats that are defined by IEEE 802.11 are configured so as to reject connection requests from wireless communication terminals that are not pre-set with the SSID and the WEP key. Therefore, for example, by setting the SSID to "ANY", or by not setting the WEP key, connection requests from all wireless LAN terminals will be permitted and the data link will be established. Nevertheless, the system is constructed such that at this stage, all access by the STA 1 to the wired LAN 2607 and all communications with the other wireless communication terminals (e.g., STA 2, STA 3, etc.) via the AP 1 are completely cut off.

In wireless communication formats that is defined by IEEE 802.11, wireless frames (wireless signals) are not encoded if the WEP key is not set. Therefore, after the data link between the access point and the wireless communication terminal has been established, a predetermined encoding format is preferably used to encode the data sent and received between that access point and the wireless communication terminals.

Next, the AP 1 sends to the STA 1 a transmission request for requesting transmission of the user identification information (user information) for determining whether or not the AP 1 is the access point which the STA 1 should connect to (step S2903). Here, the user account of the STA 1 user is used as the user identification information.

When the STA 1 receives the user identification information transmission request from the AP 1, a message is displayed for example on the display screen of the STA 1 saying, "Please input account name", thus urging input of the user identification information (which is the "user account" in the present example) (step S2904). Here, when the user inputs the user account as the user identification information, the inputted user account is sent out to the AP 1 (step S2905).

When the AP 1 receives the user account from the STA 1 as the user identification information, it is then determined whether or not an account that matches the received user account is present in the list of meeting attendees (the registration information 2800) that was pre-registered by the meeting organizer or the like in the EEPROM 2706. Here, if an account matching the user account received from the STA 1 is present in the registered information 2800, then the AP 1 is the access point which the STA 1 user should connect to. Therefore, a message indicating that the user identification information has been confirmed is sent to the STA 1 (step S2907).

Next, when the STA 1 receives the message from the AP 1 indicating that the user identification information was confirmed, the STA 1 then determines the AP 1 as the access point final connection point (step S2908), and then sends out to the AP 1 an authentication request message for access to the network, which is the wired LAN 2607 (step S2909). The AP 1 forwards the authentication request message received from the STA 1 to the authentication server 2608 (step S2910).

When the authentication request message is received from the AP 1, the authentication server 2608 sends an authentication response message to the AP 1 to request authentication information (step S2911).

When the authentication response message is received from the authentication server 2608, the AP 1 sends to the STA 1 a message requesting input of the authentication information (step S2912).

When the STA 1 receives the message requesting input of the authentication information from the AP 1, a message is displayed for example, on the display screen of the STA 1 saying, "Please input password", or the like, thus urging the user to input the information necessary to receive the authentication. Here, when the authentication information (password information) is inputted by the user (step S2913), the inputted authentication information is hashed using a unidirectional hashing function, or is enciphered using a specific enciphering format which is defined in advance between the wireless communication terminal and the access point (this is separate from the format using the WEP key), and then is sent to the AP 1 (step S2914).

When the authentication information is received from the STA 1, the AP 1 forwards that authentication information to the authentication server 2608 (step S2915). The pre-defined, specific encoding format may be used to encode these communications between the AP 1 and the authentication server 2608 as well.

When the authentication information for the user of the STA 1 is received from the AP, the authentication server 2608 determines whether or not the STA 1 user should be authenticated, based on the received authentication information (step S2916). Here, if the STA 1 user is authenticated, then a message is sent to the AP 1 indicating that the authentication succeeded (step S2917). Note, if the authentication did not succeed, a message indicating that the authentication did not succeed may be sent via the AP 1 to the STA 1 to urge the user to input the authentication information once again.

When the authentication success message for the STA 1 user is received from the authentication server 2608, the AP 1 forwards the authentication success message to the STA 1 (step S2918), and also gives permission for the STA 1 to communicate with the devices on the wired LAN 2067 or the wireless communication terminals (nodes) other than the STA 1 connected to the AP 1 and thus releases the block on communications (step S2919). Subsequently, the STA 1 begins data communications with the other devices on the wired LAN 2607 through the AP 1 (step S2920). Accordingly, even in a case where one wishes to use a specific access point during the meeting to manage the wireless communication terminals' access to the network, it is not necessary to register information for distinguishing the access points in advance on the wireless communication terminal side. This improves the convenience to the user of the wireless communication terminal.

Referring to FIG. 29, explanations were given regarding the sequence up to the point where the wireless communication terminal STA 1 of the user trying to participate in the network conferencing meeting makes the connection request to the conferencing access point AP 1, and the data communications are started. However, in general, multiple access points will be discovered if multiple access points are present within the range where the wireless communication terminal can perform wireless communications, or in the case where the wireless communication terminal searches for the access point to try to make access.

Referring to FIG. 30, explanation will now be given regarding a sequence in which the wireless communication terminal STA 1 performs the connection request to the access point AP 1 in which information for identifying the STA 1 at first is not registered, and the connection destination is ultimately switched to a desired access point APn at which the STA 1 user is registered as a meeting attendee.

FIG. 30 is an explanatory diagram for explaining a procedure for connecting to the access point in the network system in FIG. 26. In FIG. 30, the same processing as that in FIG. 29 is denoted by the same step number.

In FIG. 30, the STA 1 scans the range of frequencies usable by the wireless LAN, and then selects the first access point firstly discovered and executes the connection request to this access point (step S2901). Here, it is assumed that the AP 1 is the access point which the STA 1 first performs the connection request to.

In response with the connection request from the STA 1, the AP 1 temporarily approves the connection request and establishes the data link (step S2902). However, at this state, all access by the STA 1 to the wired LAN 2607, and all communications with the other wireless communication terminals via the AP 1 are completely cut off. Then, the AP 1 sends to the STA 1 the request for transmission of the user identification information that is used to determine whether or not the AP 1 is the access point which the STA 1 should connect to (step S2903).

When the transmission request for the user identification information is received from the AP 1, a message is displayed for example on the display screen of the STA 1 saying, "Please input account name", thus urging the input of the user identification information (which is the "account name" in this example). Here, when the user inputs the user account as the user identification information (step S2904), the inputted user account is sent out to the AP 1 (step S2905).

When the AP 1 receives the user account from the STA 1 as the user identification information, it is then determined whether or not an account matching the received user account is present in the list of meeting attendees (the registration information 2800) that was pre-registered by the meeting organizer or the like in the EEPROM 2706. Here, if an account matching the user account received from the STA 1 is not present in the registered information 2800, the AP 1 then inquires whether or not network access is permitted for the received user account to other access points (e.g., AP 2, etc.) which are pre-registered in the EEPROM 2706. In other words, via the wired LAN 2607, the AP 1 inquires whether or not the user account is registered (step S3001). (This is referred to as the user identification information inquiry process.) More detailed explanation is given below regarding the user identification information inquiry process at step S3001.

At step S3001, after the AP 1 inquires whether or not the user identification information (e.g., user account) is registered for the STA 1 to other access points, if a message of confirmation permitting network access is sent back from the access point, a message (i.e., an inquiry result notification) indicating the access point which the STA 1 should connect to (this is the access point where the confirmation message was sent back) is then sent to the STA 1 (step S3002).

When the message indicating the access point to connect to is received from the AP 1, the STA 1 disconnects the data link with the AP 1 (step S3003) and makes the connection request to the indicated access point (step S2901), and performs the processing at and following step S2902 in FIG. 29.

On the other hand, if no access point is discovered for which network access can be approved, then a message (inquiry result) indicating that no access point was discovered for which network access can be approved is sent and notified to the STA 1 (step S3002), and then the data link is disconnected (step S3003). Here, the designation of the access point is performed using the following information: the "access point name" registered by the user for the access point, which is written in the message sent back from the above-mentioned access point for which network access is approved, and the "wireless channel" which that access point uses.

Figure 31:
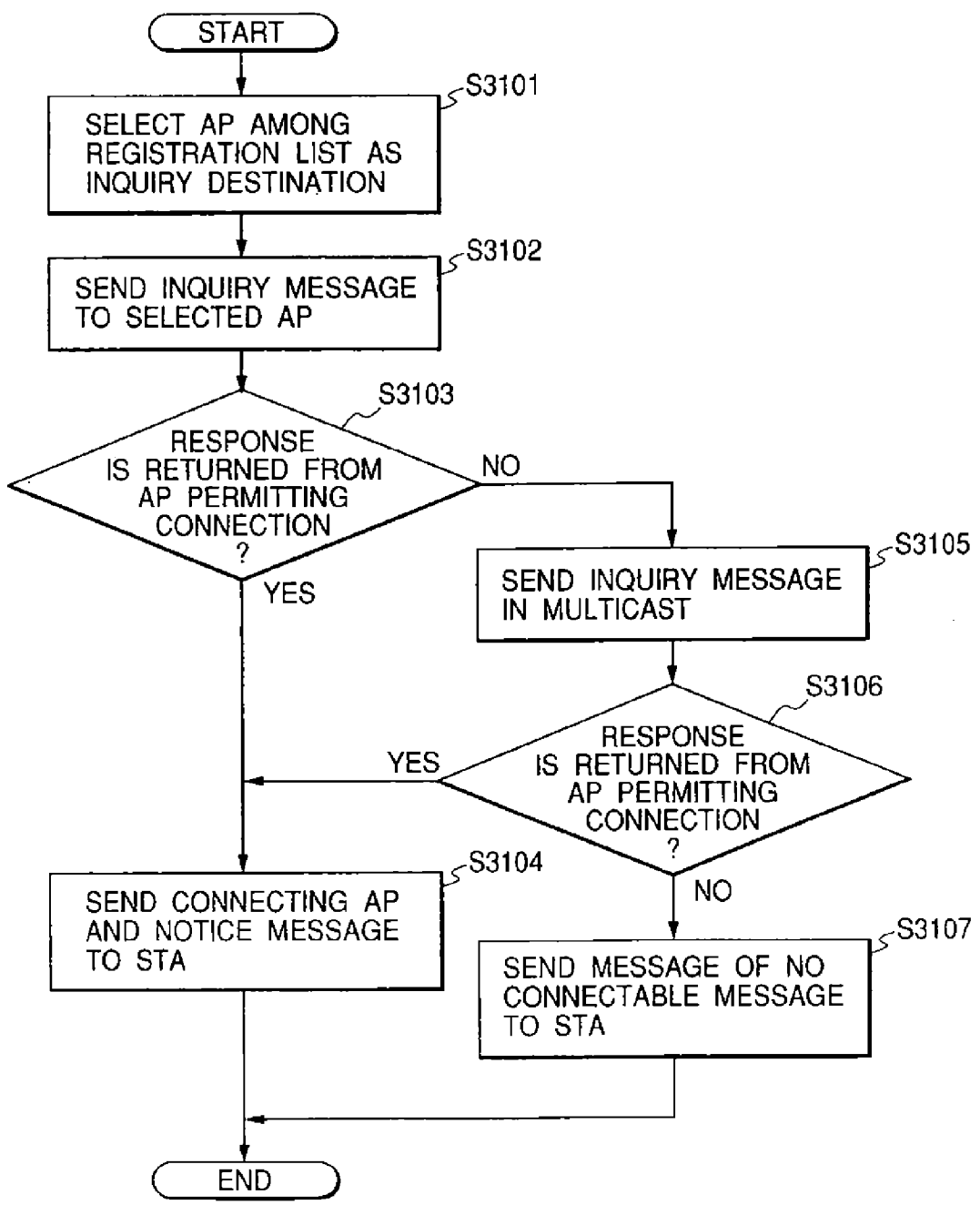
FIG. 31 is a flowchart showing processing for inquiring about user identification information at step S3001 in FIG. 30.

FIG. 31 is a flowchart showing processing for inquiring about user identification information at step S3001 in FIG. 30.

In FIG. 31, lists of identification information (e.g., the IP addresses set for access points, etc.) for several access point which are physically close when the initial settings are performed when the access point is set up, are written into predetermined areas secured which are set aside by the user in the EEPROM 2706 in each of the access points 2604-2606 present on the wired LAN 2607 (here, these access points are the AP 1, the AP 2, . . . , the APn). This list of access point identification information is used to designate other access points in the processing at step S3001 in FIG. 30 when the access point sends the message to the other access points to inquire about the user identification information.

The list of access point identification information is updated as follows. Namely, when the user identification information inquiry message is received from the other access point, the access point of this embodiment registers into the list the identification information of the other access point that sent the inquiry message. Then, if the access point identification information of the other access point is present in the list, the access point identification information that was just received is written over the older information, thus updating the content of the registration. For example, if the AP 1 sends an inquiry message to the AP 2 and the AP 3, the content registered in the access point identification information in the AP 2 and the AP 3 is updated, and then the new AP 3 is rewritten on the lists of the AP 2 and the AP 3.

If there are no free spaces in the memory area in the EEPROM 2706 that is set aside for registering the access point identification information, then the updating of the content registered in the list is performed by rewriting the oldest access point identification information in the list with the new registration information.

At first, at step S3101, the access point (the AP 1 in FIG. 30) did not have the user identification information received from the wireless communication terminal (the STA 1 in FIG. 30) registered in its EEPROM 2706. Therefore, the access point (e.g., AP 1) then selects the other access point (e.g., the AP 2 or the AP 3, etc.) from its own list of access point identification information as the message transmission destination to send the inquiry about whether or not the user identification information is registered. Then the procedure advances to step S3102.

At step S3102, the access point AP 1 sends, to the other proximal access point selected at step S3101, the message asking about whether it has registered the user identification information that has been received. Then the procedure advances to step S3103.

At step S3103, the AP 1 confirms whether or not there is a response from the other access point to which the message was sent at step S3102. Here, if there is no response message from the other access point during a predetermined amount of time from when the message was sent out at step S3102, it is judged that the user identification information is not registered at the other access point (NO at step S3103), and then the procedure advances to step S3105. On the other hand, if there is a response message within the predetermined amount of time from the other access point where the user identification information is registered (YES at step S3103), then the procedure advances to step S3104.

At step S3104, the AP 1 sends, to the STA 1 performing the network connection request, a connecting AP and notice message which contains the "access point name" and the "wireless channel" of the access point which the STA 1 should connect to, and then the current processing ends.

At step S3105, the message for performing the inquiry is sent in multicast without limiting the other access points which the user identification information will be sent to. At step S3106, confirmation is made as to whether or not there is a response from the other access points to which the multicast inquiry about the presence/absence of the user identification information was sent at step S3105. Here, if there is no response message from any of the access points within a predetermined amount of time from when the message was sent out at step S3106 (NO at step S3106), then a message is sent to the STA 1 indicating that no connectable access point was found (step S3107), and then this processing ends. On the other hand if a response from another access point where the STA 1 user identification information was registered is confirmed (YES at step S3106), then the procedure advances to step S3104, where the above-mentioned connecting AP and notice message is sent to the STA 1, and then the current processing ends.

In the embodiment described above, explanations were given regarding the network system in which the access points 2604-2606 and the authentication server 2608 were present on the wired LAN 2607. However, it is also possible to use a construction in which one of the access points has the functions of the authentication server 2608 built in.

Further, in the above-mentioned embodiment, nothing is particularly mentioned about determining access rights to other devices after access to at least one of the wireless communication terminals 2601-2603 has been approved. However, it is also possible to use a construction such that by setting an access level for each of the users of the wireless communication terminals 2601-2603, access to each network resource is determined individually for each user.

Furthermore, in the above-mentioned embodiment, when each access point updates the registered content in the list where the access point identification information is registered, if there are no free spaces in the memory areas then the oldest registered information is rewritten with the new registration information. However, it is also possible to use a construction in which for each access point registered in the list the number of inquiries during a predetermined duration of time in the past is saved and the registration information of the access point with the least number of inquiries is rewritten with the new registration information.

According to this embodiment, in the network system which is made up of the multiple access points connected to the wired LAN and the multiple wireless communication terminals capable of wireless communications to the access point, the user identification information for identifying the user of the wireless communication terminal 2601 that requests the connection to the access point is registered in advance, and then in response with the connection request from the wireless communication terminal where the user identification information is registered, permission is given for communications via the access point with the other wireless communication terminal or the device(s) connected to the LAN. On the other hand, in response with the connection request from the wireless communication terminal where the user identification information is not registered, the inquiry is made to the other access points to inquire whether or not they have registered the user identification information of the wireless communication terminal performing the present connection request, and the access point to connect to is designated for the wireless communication terminal based on the results of the inquiry. Therefore, in conferences and the like where the network is utilized, when the wireless communication terminal is required to connect to a specific access point and must change the destination point that it will connect to, the wireless communication terminal can connect to the desired access point without making modifications in advance to the settings of the access point that is designated on the wireless communication terminal side as the destination to connect to. Thus, the burden to the user of the wireless communication terminal can be alleviated.

Further, even in an environment where multiple access points are present on the network, the inquiry regarding the user identification information can only be made to the pre-registered (proximally placed) access points, and the instances where the inquiry is multicast are limited so as to suppress increases in traffic on the network and enable efficient discovery of the appropriate access point to connect to.

Note that, the present invention is not restricted to the specific embodiments described above, and various modifications can be made without departing from the gist of the present invention. For example, the information which is registered in the EEPROM 2706 (e.g., the information about the other access points, the user identification information, etc.) in the access point 2604 explained in the above-mentioned embodiment, and the content of the processing shown in FIG. 29-FIG. 31 are merely examples, and various other configurations can be thought of for the authentication method used by the authentication server 2608 and the specific format of the frames sent and received on the network of the wired LAN 2607 and the like.

As was explained in detail above, in response with the connection request from the wireless communication terminal where the user identification information is registered, the access point permits the communications with the other wireless communication terminals or the device(s) connected to the network, and when the connection is requested by the wireless communication terminal where the user identification information is not registered, the other access points connected to the network are inquired as to whether or not they have registered the user identification information of the wireless communication terminal, and then the access point for the wireless communication terminal is designated based on the result of the inquiry. Therefore, when the wireless communication terminal is requested to connect to a specific access point and its connection destination is changed, the connection can be made to the desired access point without making modifications in advance on the wireless communication terminal side to the information about the access point to connect to. This can alleviate the burden on the user of the wireless communication terminal.

It goes without saying that the present invention can also be achieved by providing a computer or a CPU with a software program for achieving the functions of each of the above-mentioned embodiments and having the computer or the CPU read out and execute the provided program. In this case, the above-mentioned program can be provided directly from a storage medium storing the program, or by downloading it from another computer or database or the like (which is not shown in the diagrams) which is connected to the Internet, or to a commercial network or local area network or the like.

Furthermore, the program is sufficient if the functions of the above-mentioned embodiments can be realized on the computer, and the form of the program may be a program executed with object code and an interpreter, or script data provided to an OS, or the like.

Furthermore, it goes without saying that the object of the present invention may also be achieved by providing a computer with a storage medium storing a software program for realizing the functions of the above-mentioned embodiments and having the computer or the CPU read out and execute the program stored on the storage medium.

In the above-mentioned embodiments, the program is stored in the ROM 2702, but the present invention is not restricted to this configuration and the storage medium providing the program may be, for example, a RAM, an NV-RAM, a hard disk, a flexible disk, an optical disk, a magneto optical disk (MO), an MO, a CD-ROM, a CD-R, a CD-RW, a DVD-ROM, a DVD-RAM, a DVD-RW, a DVD+RW, magnetic tape, a nonvolatile memory card, other types of ROM and the like capable of recording the above-mentioned program.

What is claimed is:

1. An information processing apparatus comprising:
    an obtaining unit that obtains account information and password information from a communication apparatus;
    an authentication unit that performs an authentication process based on the account information and password information obtained by the obtaining unit;
    a selection unit that selects a base station to be connected to the communication apparatus based on the account information obtained by the obtaining unit; and
    a sending unit that sends a communication parameter set to the communication apparatus if authenticated by the authentication process, wherein the communication parameter set comprises wireless LAN channel and encipher key information for wireless connecting to the base station selected by the selection unit.

2. The information processing apparatus, according to claim 1, wherein the sending unit sends the communication parameter set to the communication apparatus through another base station different from the base station selected by the selection unit.

3. The information processing apparatus, according to claim 1, further comprising a storing unit that stores database in which the account information of user is associated with the password information, and
    wherein the authentication unit performs the authentication process based on whether or not there is a combination of the account information and the password information obtained by the obtaining unit in the database.

4. The information processing apparatus, according to claim 1, wherein, if authenticated by the authentication unit, the selection unit selects the base station to be connected to the communication apparatus.

5. An information processing method comprising:
    obtaining account information and password information from a communication apparatus;
    performing an authentication process based on the account information and password information obtained in the obtaining;
    selecting a base station to be connected to the communication apparatus based on the account information obtained in the obtaining; and
    sending a communication parameter set to the communication apparatus if authenticated by the authentication process, wherein the communication parameter set comprises wireless LAN channel and encipher key information for wireless connecting to the base station selected in the selecting.

* * * * *